United States Patent [19]

Stiles

[11] 4,138,767
[45] * Feb. 13, 1979

[54] APPARATUS FOR DECASING FOOD LINKS

[75] Inventor: Charles E. Stiles, Tulsa, Okla.

[73] Assignee: Actionite Company, Oklahoma City, Okla.

[ * ] Notice: The portion of the term of this patent subsequent to May 24, 1994, has been disclaimed.

[21] Appl. No.: 772,723

[22] Filed: Feb. 28, 1977

Related U.S. Application Data

[62] Division of Ser. No. 548,518, Feb. 10, 1975, Pat. No. 4,024,602.

[51] Int. Cl.² .............................................. A22C 11/02
[52] U.S. Cl. ........................................... 17/1 F; 17/49
[58] Field of Search ...................... 17/1 F, 49, 45, 11, 17/33, 34, 35

[56] References Cited

U.S. PATENT DOCUMENTS

| | | | |
|---|---|---|---|
| 3,023,452 | 3/1962 | James et al. | 17/1 F |
| 3,029,749 | 4/1962 | De Jersey | 17/33 |
| 3,156,006 | 11/1964 | Gouba | 17/1 F |
| 3,312,995 | 4/1967 | Garey | 17/1 F |
| 3,480,991 | 12/1969 | Edwards, Jr. | 17/11 |
| 3,487,498 | 1/1970 | Grandon et al. | 17/1 F |
| 3,531,034 | 9/1970 | Klyce | 17/1 F |
| 3,568,242 | 3/1971 | Moore | 17/1 F |
| 3,716,891 | 2/1973 | Demarest | 17/1 F |
| 3,739,426 | 6/1973 | Schnell | 17/33 |
| 3,805,328 | 4/1974 | Strandine et al. | 17/11 |
| 4,024,602 | 5/1977 | Stiles | 17/1 F |

FOREIGN PATENT DOCUMENTS 518286 11/1955 Canada ...................................... 17/1 F

*Primary Examiner*—Russell R. Kinsey
*Assistant Examiner*—Paul J. Hirsch
*Attorney, Agent, or Firm*—Dunlap, Codding & McCarthy

[57] ABSTRACT

An improved apparatus for decasing food links comprising an accelerator assembly imparting initial feed-through velocity, a preconditioner that heats the casings to facilitate removal, a casing slitter assembly, a casing drive assembly, and a stripping head assembly featuring directed air jets and meshing gripping gears that pull the casings away from the links. The accelerator and driving assemblies cooperate to impart high velocity to the food links while minimizing product damage in a machine that assures complete operator safety. The casing slitter assembly provides a pivoting slitter head that accurately follows the shape of the food link, slitting the casing without damaging the food link. An adjustable guide assembly provides parallel axial alignment of the food links with the meshing gripping gears.

14 Claims, 26 Drawing Figures

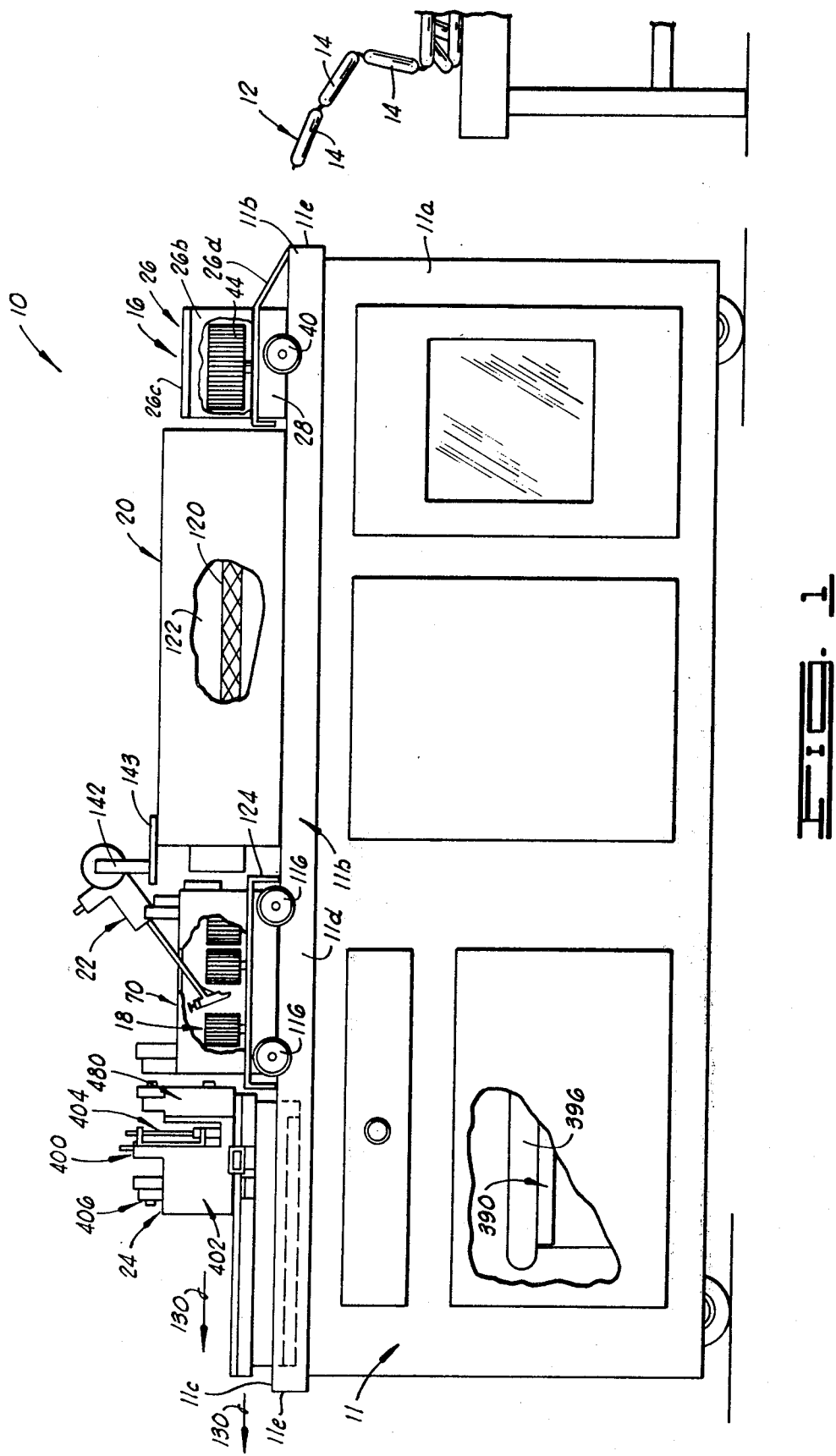

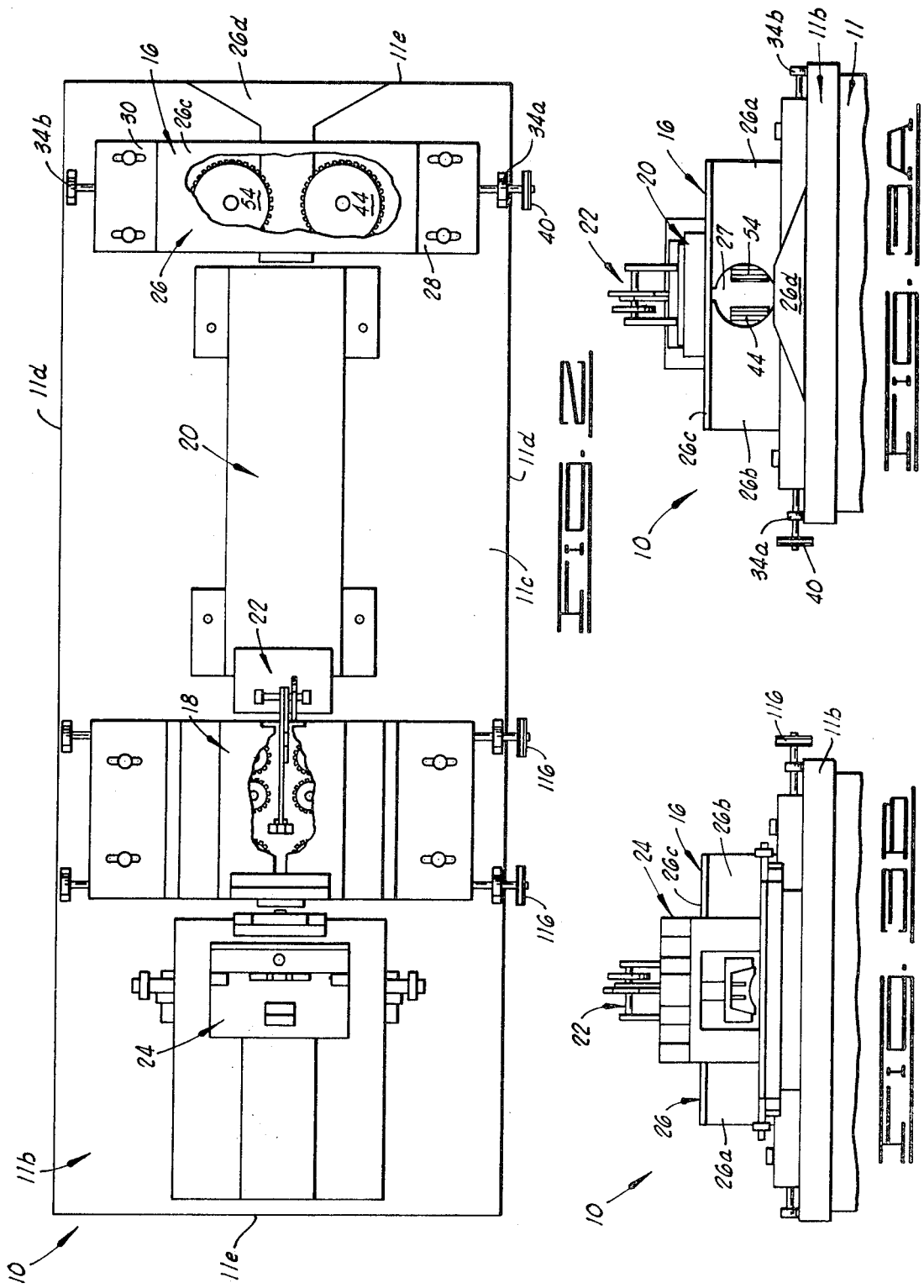

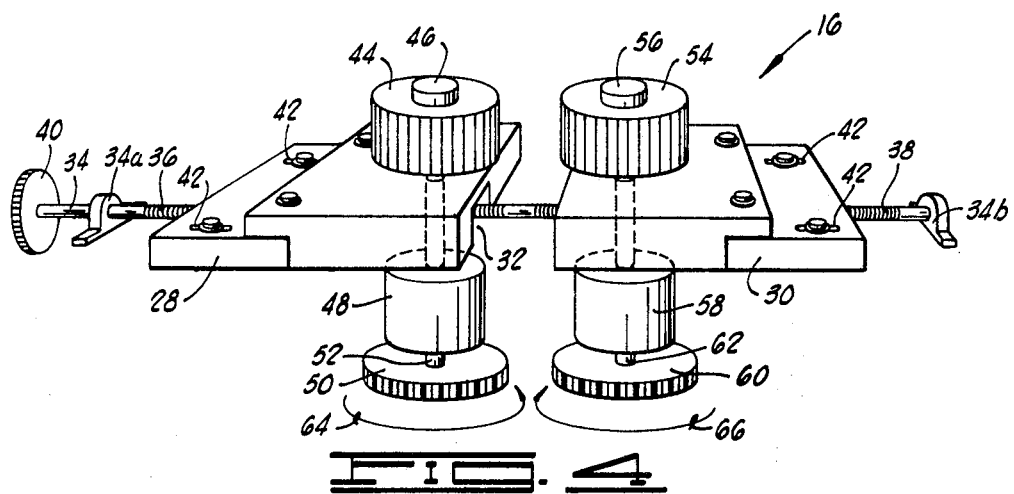
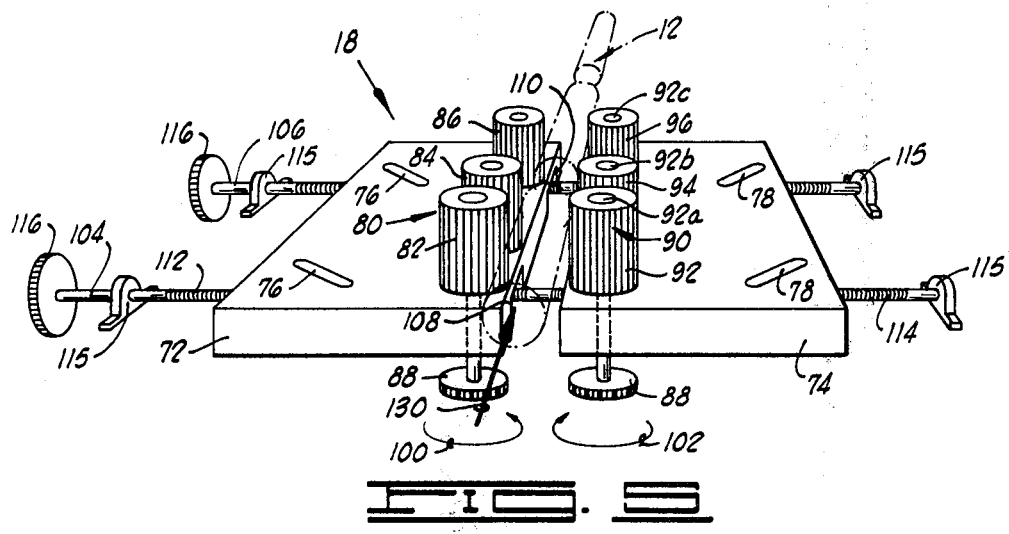
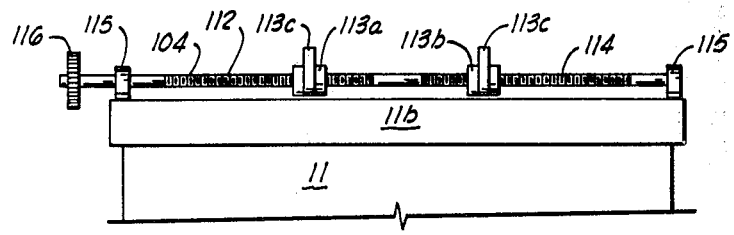

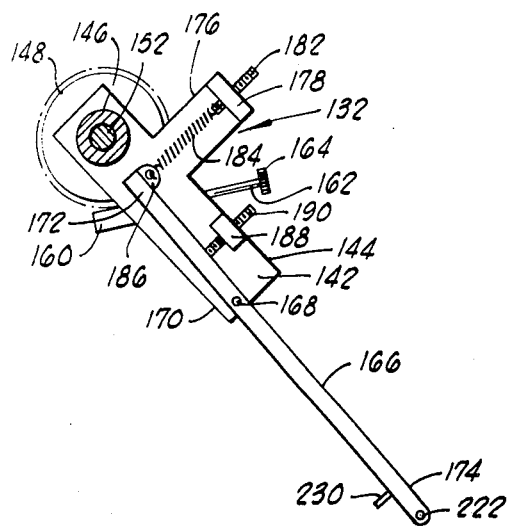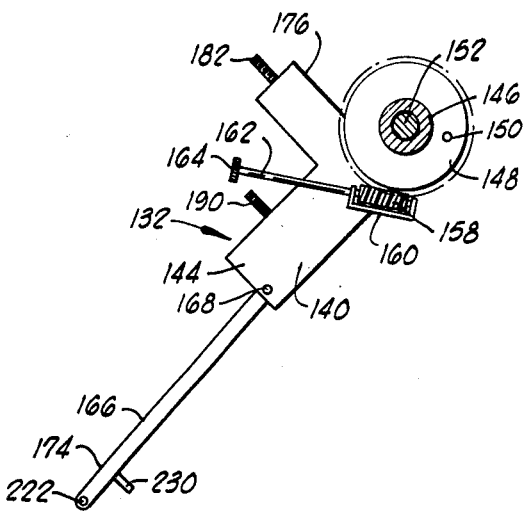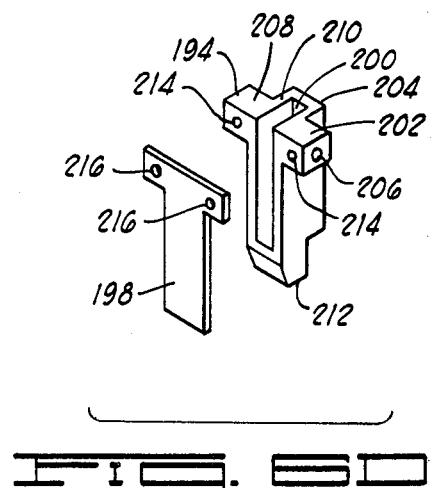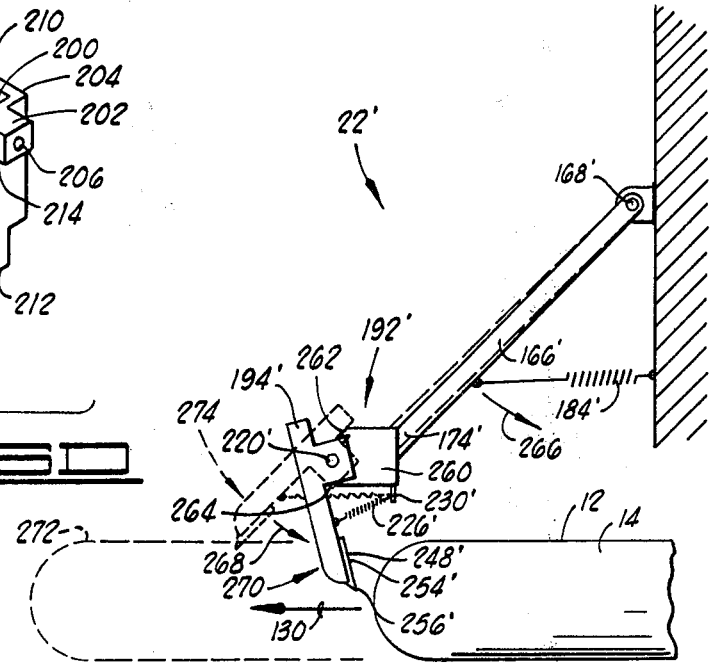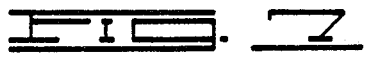

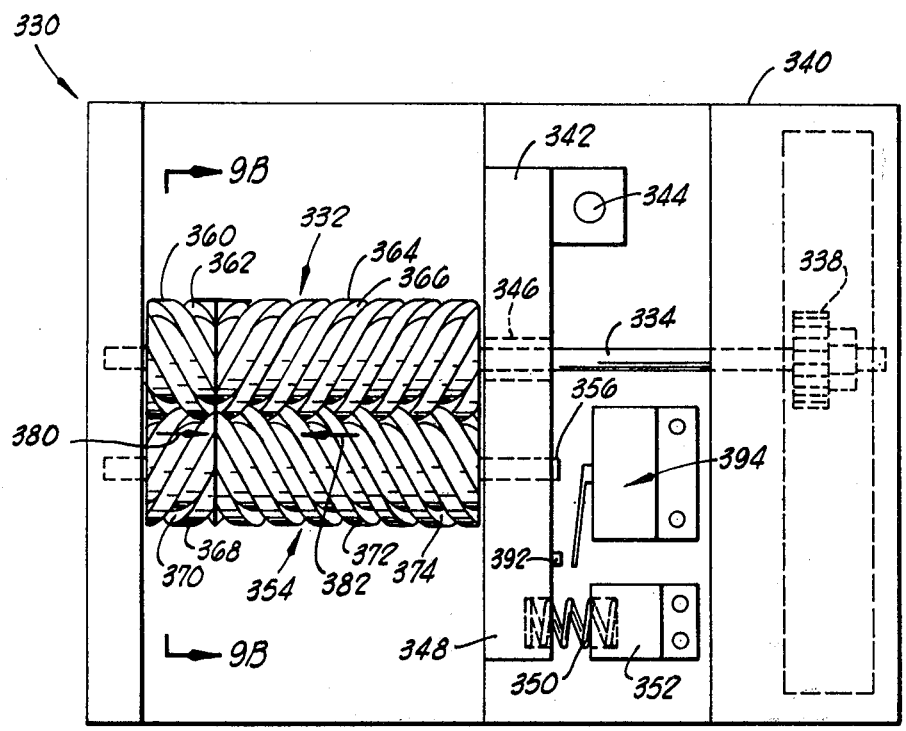
FIG. 9
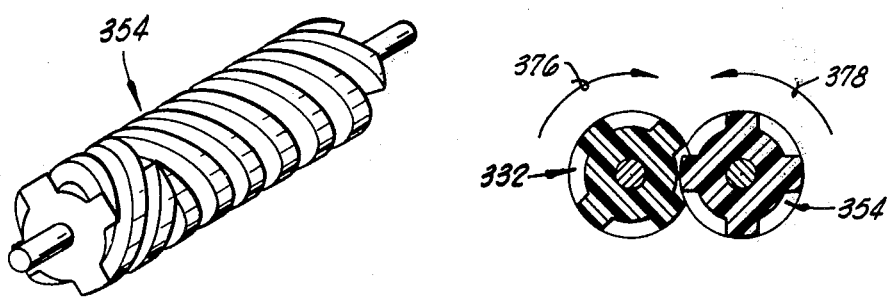
FIG. 9A
FIG. 9B

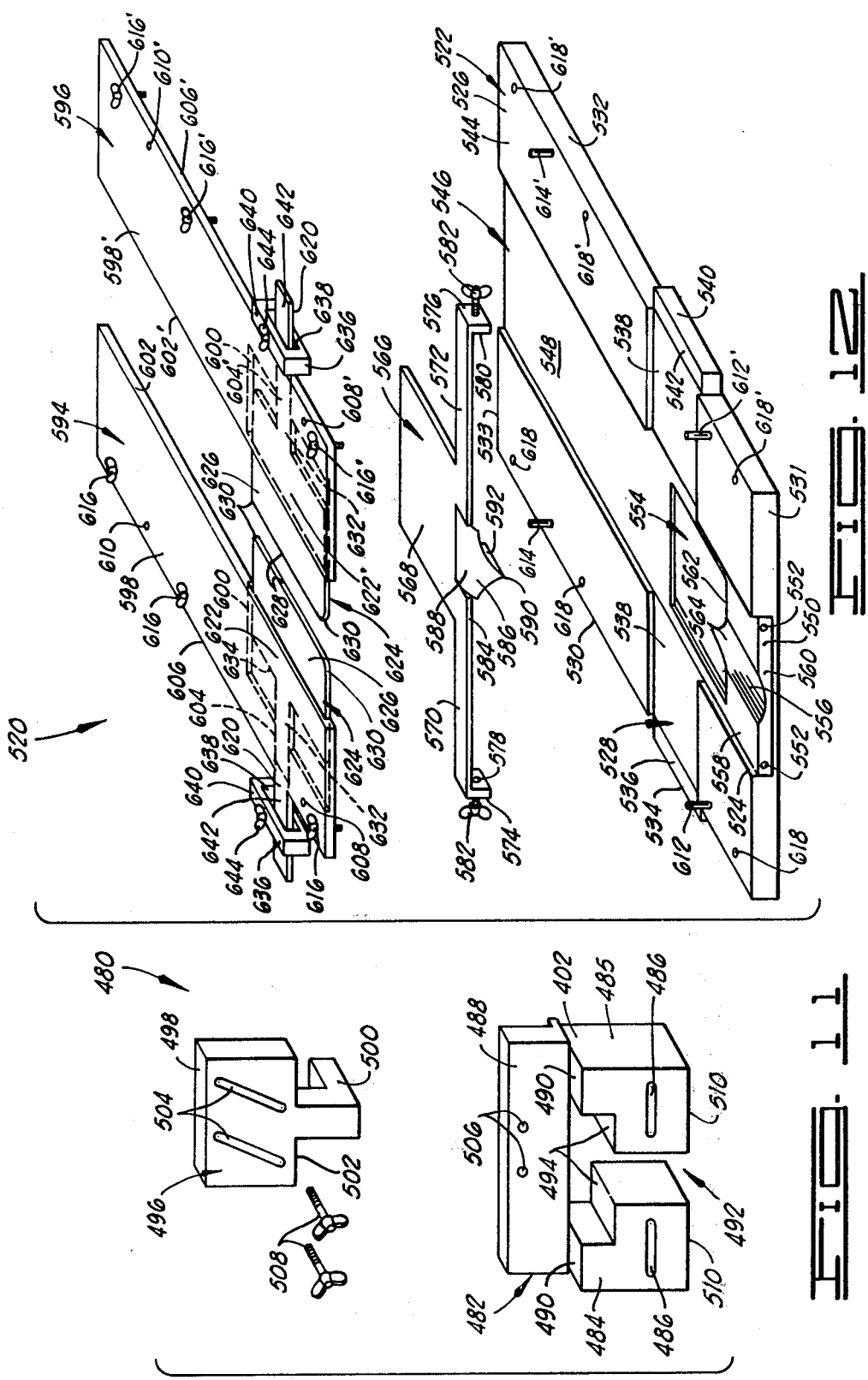

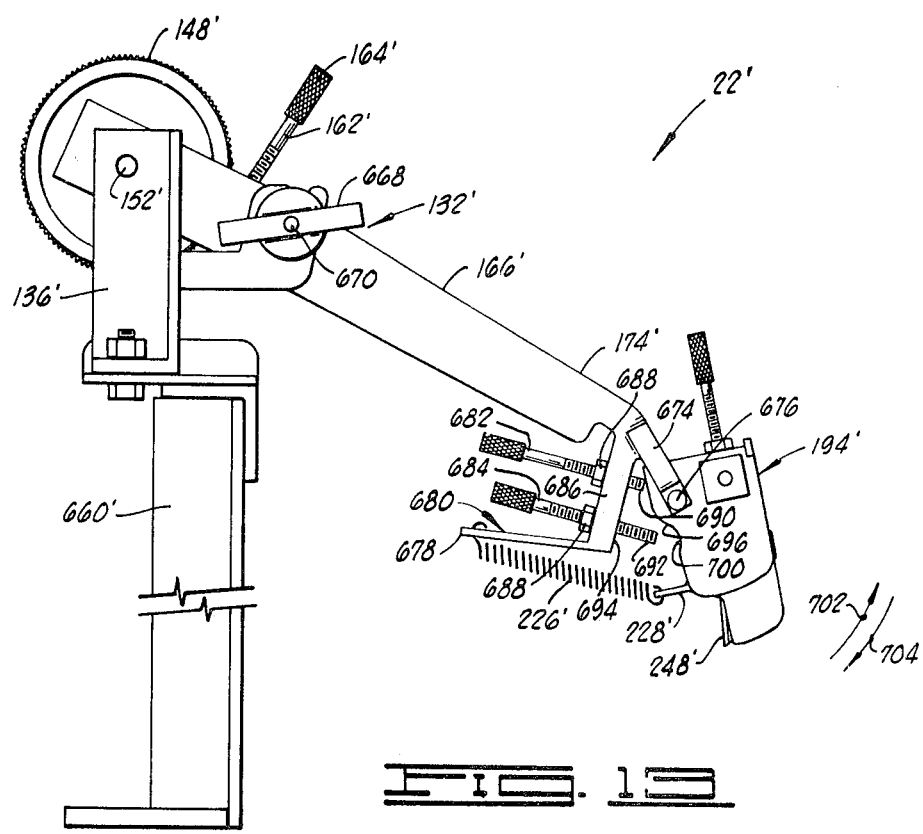
FIG. 13
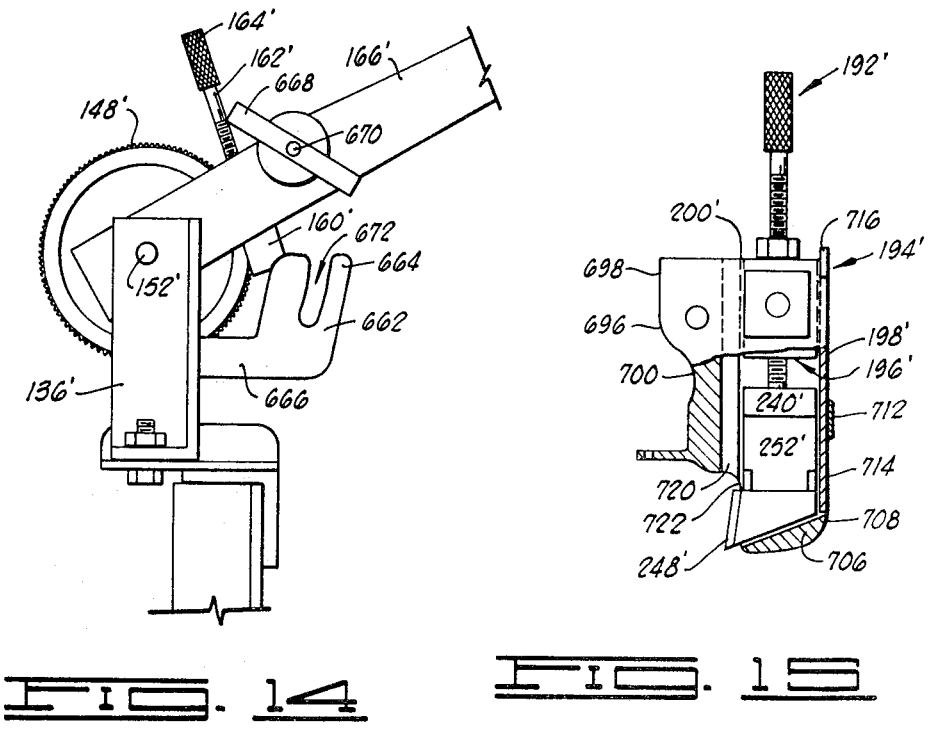
FIG. 14
FIG. 15

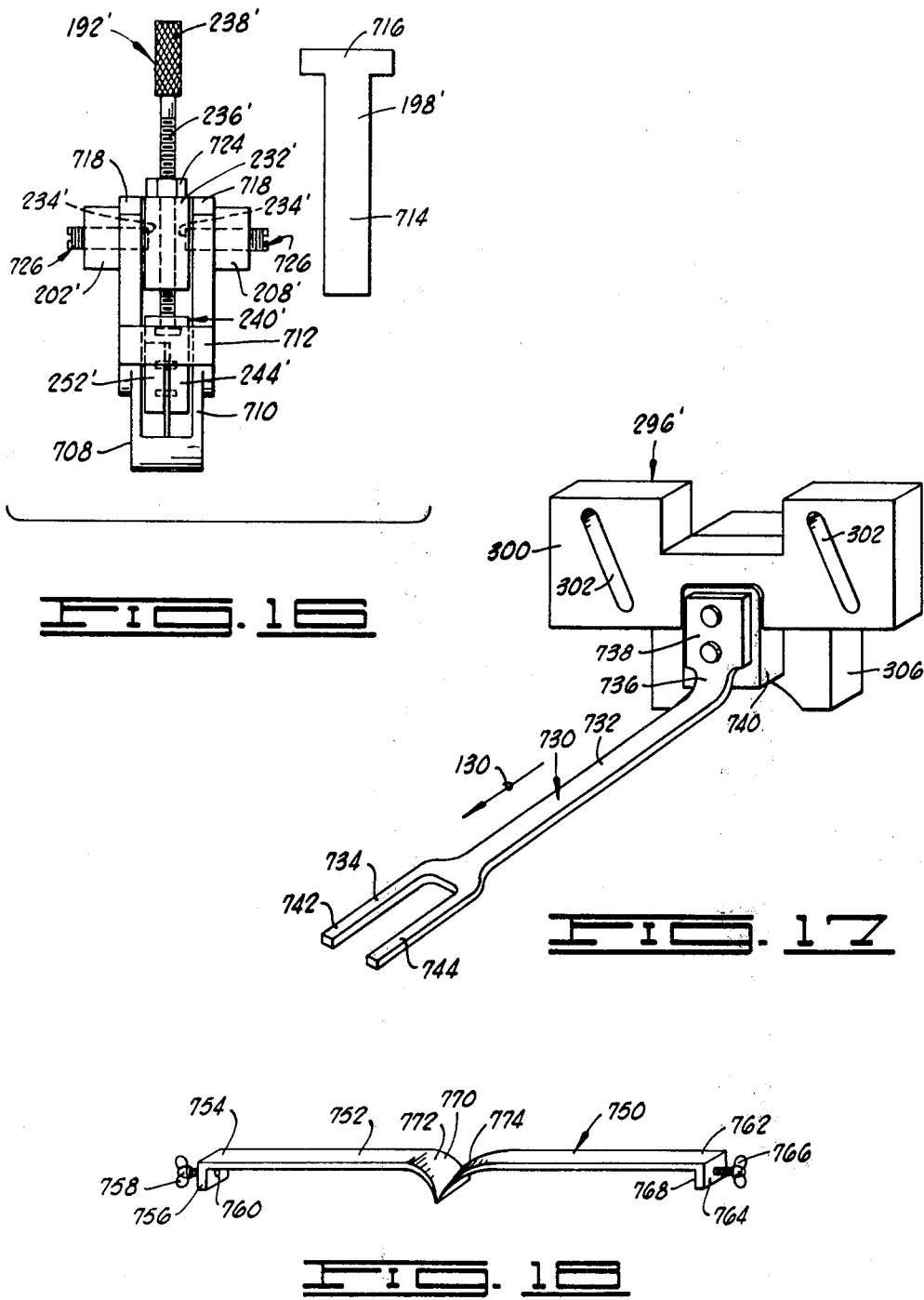

APPARATUS FOR DECASING FOOD LINKS

This is a division of application Ser. No. 548,518, filed Feb. 10, 1975 now U.S. Pat. No. 4,024,602.

BACKGROUND OF THE INVENTION

1. Field of Invention

The present invention relates generally to the field of food processing, and more particularly, but not by way of limitation, to the field of removing casings from food links and the like.

2. Description of Prior Art

In the making of food links such as weiners, frankfurters, link sausage and the like, a mixture of ground meat and sometimes compatible fillers is forced into a tubular casing, which forms an elongated tube filled with an edible compound. The tube is then constricted at intervals to produce links. The links are cooked, smoked, or otherwise processed so as to establish each link as an individual entity of edible composition. While the links may be separated prior to cooking or the like, it has been found to be a manufacturing expedient to maintain the links in a string of links until the processing has been completed, whereupon the links are separated.

The casings employed for such usage may be edible casings prepared from the intestines of edible animals, or synthetic casings substantially similar to natural casings. These natural casings are edible, and it is the discretion of the food processor as to whether to market the links with or without such casings. Synthetic casings have also been developed for the purpose of containing and forming the links while cooking or the like, and which require removal prior to human consumption. When such casings are removed, the food link products are commonly referred to as "skinless" links.

Over the years, skinless food links have become popular and in much demand, generally because of a more tender food product. With this increase in demand, the large number of food links produced has outstripped the early means of casing removal. That is, at one time it was common in the food industry to produce such skinless food links by manually slitting and peeling the casings from the food links. As this was costly, time-consuming, and gave rise to sanitary problems, it became necessary to develop machines that could rapidly decase the food links.

A common synthetic material used for the casing of food links is polyethylene film, an example of which is commercially available under the trademark "Visqueen," made by the Visking Company, a division of Union Carbide Corporation, Chicago, Illinois. Such material provides a very tough casing that is practically unremovable except by slicing or the like. Since polyethylene film is very thin, on the order of 1/1000 of an inch thick or less, the removal of polyethylene casings or other such synthetic casings has presented a very difficult task of automation to the food processing industry.

Machinery developed by the prior art for removing casings from food links and the like has necessarily been complex, requiring precision cutters and generally delicate and troublesome casing removal techniques. The very nature of handling food products presents the customary sanitary requirements common in the food processing industry, and presents additional problems introduced in moving food links rapidly while accurately positioning the same relative to slitting assemblies, vacuum removal systems, and the like.

SUMMARY OF THE INVENTION

The present invention provides an improved apparatus for removing the casings from food links and the like comprising a frame, accelerator means that imparts an initial first velocity to the food links, preconditioner means that heat-conditions the food links to aid in casing removal, drive means that increases the velocity of the food links to a second velocity, slitter means that imparts a longitudinal slit in the casing of the individual links, and stripper means that forces the casings in a direction away from the food links. The components of the apparatus cooperate to rapidly move the food links consecutively therethrough in order to efficiently decase the food links.

Accordingly, it is an object of the present invention to provide an improved apparatus for decasing food links having high-speed operation and large production capacity.

Another object of the present invention is to provide an improved apparatus for decasing food links featuring ease of operation and minimum production downtime.

Another object of the present invention is to provide an improved apparatus for decasing food links having positive feed for pulling weiner strings therethrough, and positive action for casing removal.

Another object of the present invention is to provide an improved apparatus for decasing food links featuring modular, modern design for ease of removal, repair, and replacement of all components thereof.

Another object of the present invention is to provide an improved apparatus for decasing food links featuring smooth, trouble-free operation and minimum maintenance.

Another object of the present invention is to provide an improved apparatus for decasing food links featuring adjustable settings for varying size food links.

Another object of the present invention is to provide an improved apparatus for decasing food links featuring variable speed operation through a continuous range of speeds from near zero to a maximum output.

Another object of the present invention is to provide an improved apparatus for decasing food links featuring ease of casing disposal.

Another object of the present invention is to provide an improved apparatus for decasing food links featuring totally enclosed and sealed drive and electrical components to permit ease of machine cleaning while ensuring the integrity of all such components, thereby maximizing cleanliness of operation.

Another object of the present invention is to provide an improved apparatus for decasing food links featuring maximum personnel safety.

Other objects, features, and advantages of the present invention will be apparent to those skilled in the art from the following detailed description of presently preferred embodiments of the invention given for the purpose of disclosure when taken in conjunction with the accompanying drawings.

BRIEF DESCRIPTION OF THE DRAWINGS

FIG. 1 is a front side view of the decasing machine of the present invention.

FIG. 2 is a top plan view of the decasing machine of FIG. 1.

FIG. 3A is a partial front end view in elevation of the decasing machine of FIG. 1.

FIG. 3B is a partial rear end view in elevation of the decasing machine of FIG. 1.

FIG. 4 is a semi-diagrammatical, isometric view of the accelerator of the decasing machine of FIG. 1.

FIG. 5 is a semi-diagrammatical, isometric view of the main drive assembly of the decasing machine of FIG. 1.

FIG. 5A shows the arrangement of the position adjust rods of the main drive assembly of FIG. 5.

FIGS. 6A through 6D show one embodiment of a slitter blade assembly and components thereof that form a part of the decasing machine of FIG. 1.

FIG. 7 is a diagrammatical depiction of the operation of the slitter assembly of FIGS. 6A through 6D.

FIG. 9 is a top plan view of the stripper gear assembly of the decasing machine of FIG. 1.

FIG. 9A is an isometric view of one of the gripping gears of the stripper gear assembly of FIG. 9.

FIG. 9B is a cross sectional view taken at 9B—9B in FIG. 9.

FIG. 11 is a view of a guide mechanism in exploded view that is positioned near the exiting end of the housing assembly of FIG. 8.

FIG. 12 is an isometric, exploded view of the stripper head cover assembly disposed between the stripper gear of FIG. 9 and the guide mechanism of FIG. 10.

FIG. 13 shows a side elevational view of another embodiment of a slitter blade assembly of the decasing machine of the present invention.

FIG. 14 is a partial view of the slitter blade assembly of FIG. 13 showing the pivot bar rotated upwardly.

FIG. 15 is a partial cutaway view of the head block of FIG. 14 showing the blade and blade holders.

FIG. 16 is a front elevational view of the head block of FIG. 14 with the side plate removed.

FIG. 17 is an isometric view of a link pressure applicator used in conjunction with the slitter blade assembly of the present invention.

FIG. 18 is an isometric view of a spanner control member used in conjunction with the stripper gear assembly of the present invention.

DESCRIPTION OF THE PREFERRED EMBODIMENT

Figure 5B:
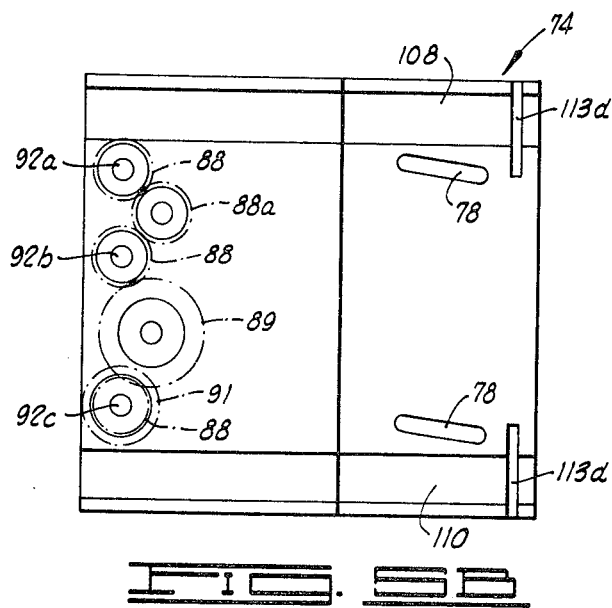
FIG. 5B is a bottom view of one of the drive assembly support blocks of the main drive assembly of FIG. 5.

Referring to the drawings, and particularly to FIGS. 1 through 3B, the apparatus of the present invention is illustrated and generally designated by the numeral 10. The casing removal apparatus, decasing machine 10, facilitates the removing of casings from strings of weiners and the like as they come from a cooking process. When the weiners come from the cooker, they are contained in a continuous string of casing 12, and this casing must be removed from the weiners 14 so that the individual weiners can be packaged. The casing removal apparatus 10 is designed to accomplish this purpose in a fast, efficient manner with a minimum of product damage. The use of an accelerator assembly 16, a positive main feed 18, preconditioner 20, slitter assembly 22 and a positive acting stripper assembly 24 will be discussed in detail below and described as they cooperatively interact with other components of the decasing apparatus 10 to achieve the objects of the present invention.

Decasing apparatus 10 comprises a support frame 11 that houses the various electrical and mechanical support components that operate the machine components to be described below. Preferably, frame 11 has an outer cabinet 11a and a top plate 11b fitted thereover. Top plate 11b is comprised of a flat, planar member 11c that serves as a component base and, side edges 11d and end edges 11e that extend downwardly from planar member 11c to overlap cabinet 11a. This arrangement provides a removable component base that seals the interior of frame 11 when in place.

The casing string 12 enters decasing apparatus 10 by first entering accelerator 16. As shown in FIG. 3a, the accelerator assembly 16 comprises a housing assembly 26 that provides a tunneled opening 27 that guides casing string 12 into accelerator 16, the tunnel opening being sized to prevent the operator's hand from entering and passing therethrough. Housing assembly 26 is comprised of a right-hand guide 26a and a left-hand guide 26b that are shaped to serve as protective shields over the moving components of accelerator 16, and to form the tunnel 27. A cover plate 26c is bolted to one of the guides and extends over the other. In FIG. 2 a partial cutaway of plate 26c shows the accelerator rollers that are to be discussed below. Also, a guide ramp 26d, an inclined plate secured by conventional means in front of tunnel 27, serves as an entry rampway for weiner casing 12 entering tunnel 27, and further serves to provide ready access to the roller assembly blocks, discussed below, for ease of cleaning.

Referring to FIG. 4 shown therein is an isometric, semi-diagrammatical representation of accelerator assembly 16 absent housing assembly 26. Accelerator assembly 16 comprises a first roller assembly support block 28 and a second roller assembly support block 30 that are slidingly supported on the top of support frame 11 in a manner that permits sliding of the blocks toward or away from each other in a manner and for a purpose that will become clear below. Each of the roller assembly support blocks 28, 30 has a transverse relief groove 32, these relief grooves being aligned one with the other. A longitudinal bar 34 having a first threaded portion 36 and a second threaded portion 38 is disposed in relief groove 32 and journaled in the stationary bearing blocks 34a and 34b that are attached to component base 11b as shown in FIG. 3A. An adjusting knob 40 is provided at one end of bar 34 for the purpose of providing means to rotate the bar, and means are provided for attaching support blocks 28, 30 to the bar such that turning of the longitudinal bar 34 via adjusting knob 40 will cause the support blocks 28 and 30 to move toward or away from each other. This attachment means will be described in more detail below.

The first roller assembly support block 28 and the second roller assembly support block 30 are provided with longitudinal slots 42 passing through the blocks to provide securing slots for attachment to component base 11b in a conventional bolting fashion. Guide blocks or the like may be provided to stabilize the direction of travel of the roller assembly support blocks as they are adjusted toward or away from each other in a manner and for the purpose to be described in more detail below.

Bearingly mounted to the first roller assembly support block 28 is a first accelerator roller 44 that is connected to one end of a vertical drive shaft 46 passing through an appropriately sized aperture in the support block, the other end of drive shaft 46 having a first cam clutch 48 connected thereto. A drive sprocket 50 is connected to the first cam clutch 48 via shaft 52. Mounted to the second roller assembly support block 30 is a second accelerator roller 54 that is pressed onto one end of a drive shaft 56 that passes through an appropriately sized aperture in the support block, drive shaft 56 having a cam clutch attached to the other end thereof. A drive sprocket 60 is connected to second cam clutch 58 via a shaft 62. While sprockets 50 and 60 have been described as being gears, it will be understood that these can also be provided as sheaves for belt drives. Although not illustrated, disposed within cabinet 11a and support frame 11 is a variable speed electric motor and a gear box provided to drive sprockets 50 and 60 such that sprocket 50 turns in a first drive direction 64 and sprocket 60 is driven in a second drive direction 66.

Cam clutches 48 and 58 are of the type, and oriented such that first cam clutch 48 has a driving relationship to drive shaft 46 while turning in drive direction 64 and has a free wheeling relationship to drive shaft 46 when turning in a direction opposite to drive direction 64. In like manner, but in opposite orientation thereto, cam clutch 58 is established to have a driving relationship to drive shaft 56 when rotated by the action of sprocket 60 in drive direction 66, and has free wheeling relationship to drive shaft 56 when rotated in the opposite direction to drive direction 66. While several commercial clutches are available to serve as cam clutches 48 and 58, one such clutch for this purpose is sold as Model TB3 by the Morse Manufacturing Company. The purpose of cam clutches 48 and 58 will become clear below as their cooperation with the main drive assembly 18 is discussed in detail. The electric motor drive that rotates the drive sprockets 50 and 60 is selected to be of the variable speed type so as to impart a preferred speed ranging from very low to very high rotation speeds.

In order to understand the cooperation of accelerator assembly 16 with main drive assembly 18, this disclosure will now turn to a discussion of main drive assembly 18. As indicated in FIG. 1, main drive assembly 18 is located some distance from accelerator assembly 16, and there are a number of components between these two components that will be discussed in more detail below. The purpose for locating main drive assembly 18 in its general position is to pull the casing string 12 with tension under slitter assembly 22 following the heat conditioning given the string by the preconditioner 20, which also will be discussed in detail below. It is apparent that starting a string of weiners 14 through the decasing apparatus 10 would be difficult if it were not for accelerator 16 which gives an initial velocity to casing string 12. It is common to feed a casing string 12 of a predetermined length having a desired multiple of weiners 14, after which another casing string 12 is fed through decasing apparatus 10. As was mentioned briefly in the prior art discussion above, there are some prior art machines that require the operator to hand feed the first portion of a casing string 12 into the machine, and to thread the leading end of the string into the machine to casing driving mechanism. While this is generally acceptable, it does require additional operator time and involves an element of operator exposure to the internal components of the decasing apparatus. In decasing apparatus 10 of the present invention, accelerator assembly 16 is capable of receiving a casing string 12 at an initial zero velocity and automatically imparting a first velocity by which the casing string is driven unaided so as to reach the main drive assembly 18, which will now be described in detail. Decasing apparatus 10 makes it unnecessary to tie the successive casing strings together, as it will take strings of casings generally as fast as an operator can feed them to the machine, and since knots tied between strings are sometimes troublesome in causing jams, this source of problems is eliminated.

Referring now to FIG. 5, shown therein is an isometric, semi-diagrammatical representation of main drive assembly 18 of the present invention as shown without a main feed guide assembly 70 that will be described below, the main feed guide assembly being provided to enclose the moving components of the main drive assembly. Main drive assembly 18 comprises a first drive assembly support block 72, and a second drive assembly support block 74, these support blocks being supported on component base 11b in the same manner as the roller assembly support blocks 28 and 30 discussed above with the exception that bolt slots 76 and 78 are provided at an angle so as to maintain constant tension on the drive chain as will become clear below.

The first drive assembly support block 72 includes a first set of drive rollers 80, the set including a first roller 82 and a second roller 84 that are in close spatial proximity to each other, and a third roller 86 that is located a predetermined distance from the first and second rollers. All of the rollers that comprise the first set of drive rollers 80 are identical, have their axles of rotation generally parallel to each other, and have an in-line relationship to each other. Each of the rollers that comprise the first set of drive rollers 80 are located on one end of a respective drive shaft that is bearingly journaled in appropriately sized apertures and bearing means in the first drive assembly support block 72, each such drive shaft passing therethrough and having a drive gear 88 on the other end thereof.

The second drive assembly support block 74 bearingly supports a second set of drive rollers 90 that is comprised of a first roller 92, a second roller 94 and a third roller 96, each of which are identical with the rollers that comprise the first set of drive rollers 80. In the same manner as was described for the first set of drive rollers 80, first roller 92 is located in close proximity to second roller 94, while third roller 96 is spaced apart therefrom in like manner to third roller 86 of the first set of drive rollers 80. Also, the rollers that comprise the second set of drive rollers 90 are established with an in-line relationship. Each of the rollers 92, 94 and 96 are attached to one end of a respective drive shaft that is bearingly journaled in an appropriately sized aperture and bearing means in the second drive assembly support block 74, these drive shafts being generally parallel to each other, and each such drive shaft having at the other end thereof a drive gear 88.

All of the drive gears 88 that are associated with rotating the rollers that comprise the first set of drive rollers 80 are turned in a first drive direction 100, and all of the drive gears 88 that are associated with rotating the rollers that comprise the second set of drive rollers 90 are turned in a second drive direction 102. The rotation of all of the drive gears 88 is brought about by the same variable speed electric motor discussed briefly above in relationship to accelerator 16. Of course, an appropriate gear box must be provided. Although not discussed in detail herein, a speed control potentiometer is provided to vary the speed of the drive rollers of main drive assembly 18 and accelerator rollers of accelerator assembly 16, the ratio of the speeds of such roller sets being predetermined as discussed more fully below.

Threaded position adjust bars 104 and 106 pass through respectively aligned relief grooves 108 and 110 in the first and second drive assembly blocks 72 and 74. As shown in FIG. 5A, which is a view of position adjust bar 104, the position adjust bar has a first threaded portion 112 and a second threaded portion 114 that are threaded in reverse pitch relative to each other. Supported on position adjust bar 104 are the travel blocks 113a and 113b respectively apertured and threaded to engage threaded portions 112 and 114. Each of the travel blocks 113a and 113b have an upwardly extending webb plate 113c. Located beneath each of the support blocks 72 and 74 along the path of groove 108 is a slot 113d (shown in FIG. 5B) that matingly receives and seats the respective webb plate 113c attached to the travel blocks 113a and 113b. The purpose of this arrangement is to provide connecting position adjust bar 104 so as to cause these support blocks to move toward or away from each other depending upon the direction of rotation of bar 104. Of course, position adjust bar 106 is similarly constructed and effectuates like movement of support blocks 72 and 74 as this bar is rotated. Position adjust bars 104 and 106 are journaled in stationary bearing blocks 115 and 116 that are attached to component base 11b. A position adjust wheel 116 is connected to each of the position adjust bars 104 and 106 as shown.

The attachment means discussed briefly above for accelerator assembly 16, connecting the assembly support blocks to longitudinal bar 34, is similar in construction to position adjust bar 104 and its accompanying travel blocks. That is, travel blocks are threadingly engaged with threaded portions 36 and 38 of longitudinal bar 34. Appropriately shaped recesses or slots are provided in the underside of assembly support blocks 28 and 30, and in like manner to the discussion above for support blocks 72 and 74, support blocks 28 and 30 are caused to move toward or away from each other by the rotation of the adjusting knob 40.

The description of main drive assembly 18, reviewed briefly, comprises a first set of in-line drive rollers 80 that are rotated in the first drive direction 100, and a second set of in-line drive rollers 90 that are rotated in the opposite drive direction 102, the line of the first set of drive rollers 80 being positioned directly across from the line of the second set of drive rollers 90, the distance between these two sets of rollers being adjustable by varying the space between the first drive assembly support blocks 72 and the second drive assembly support blocks 74, the distance therebetween being determinable by the rotating adjustment of position adjust wheels 116.

The lines of travel of the first drive assembly support block 72 and the second drive assembly support block 74 relative to top surface of 11c of component base 11b is determined by the angled slots 76 and 78. To facilitate the skewing movements of support blocks 72 and 74, relief grooves 108 and 110 are made considerably wider than the diameters of position adjust bars 104 and 106 disposed therein. As shown in FIG. 5B, the slots 113d located in the underside of support blocks 72 and 74 are shaped so as to fixedly establish the transverse position of travel blocks 113a and 113b, while permitting the travel of support 72, 74 in a direction normal to position adjust bars 104, 106 simultaneously to the travel of these support blocks toward or away from each other.

Referring yet to FIG. 5B, a drive gear 88 is connected to each of the shafts 92a, 92b, and 92c, respectively associated with drive rollers 92, 94, and 96. A transfer gear 88a is journaled to support block 74 and gearingly engages the drive gears 88 that are connected to shafts 92a and 92b. In like manner, a transfer gear 89 is journaled to support block 74 and gearingly engages the gears 88 that are connected to the shafts 92b and 92c. A drive sprocket 91 is also mounted to shaft 92c, this drive sprocket being designed to accept a drive chain disposed in frame 11 and which is driven by the gear box and variable speed electric motor discussed hereinabove. Of course, the discussion for support block 74 will suffice to describe the mechanism contained on the underside of support block 72 as well.

In preferred form, a single gear box having dual output drives is connected via drive chains to the drive sprockets 91. Angled slots 76, 78 permit the adjustment of support blocks 72, 74 by rotating position adjust wheels 116, this adjustment being effectuated while at the same time maintaining constant tension on the drive chains drivingly connected to drive sprockets 91. Of course, the angles of slots 76, 78 must be predetermined to maintain sprockets 91 at a predetermined distance from the drive outputs of the gear box as support blocks 72, 74 are caused to move relative to each other. A variable speed electric motor, as suggested above for driving the gear box, provides an arrangement to effectively drive all of the drive rollers of the first and second sets of drive rollers 80, 90 at a determined rotational speed selectable from a predetermined speed range.

Conventional bolting means passing through slots 76, 78 are used to secure the support blocks to component base 11b, and it will be recognized that these bolting means must be loosened prior to adjusting the distance therebetween, and tightened upon reaching the desired placement of the support blocks relative to each other.

The purpose of main drive assembly 18 is to provide the main pulling action to casing string 12 so that the string passes through decasing apparatus 10 at a velocity selectable from a range of drive speeds of the rollers of the drive assembly. Drive assembly 18 brings the casing string 12 up to full machine speed after it has passed through accelerator 16. As was discussed above, the purpose of accelerator assembly 16 is to impart an initial acceleration to the strings of weiners as they are fed into decasing machine 10. As depicted in the accompanying figures, all of the rollers 44, 54, 82, 84, 86, 92, 94 and 96 are made from a polymeric, machinable material and are ribbed by the provision of vertically extending slots in order to provide a firm, yet somewhat resilient, gripping surface against which weiners 14 are passed between. While this is the preferred method of construction for these rollers the present invention is not limited by such construction suggestions.

As was discussed above, the first accelerator roller 44 and the second accelerator roller 54 of accelerator assembly 16 are driven by drive pulley sprockets 50 and 60 via cam clutches 48 and 58. The principle of operation of the cam clutches was discussed above, and can be summarized by stating that the cam clutches offer a uni-directional drive relationship to drive shafts 46 and 56 while at the same time being freewheeling in the opposite directions. In order to understand the cooperation between the drive rollers of main drive assembly 18, and the accelerator rollers of accelerator assembly 16, it is necessary to establish what happens after the string of weiners, that is casing string 12, passes through accelerator assembly 16. Upon reaching the drive rollers of main drive assembly 18, the string of weiners is pulled at a faster speed than that which is imparted by accelerator assembly 16. Of course, while casing string 12 is first passing through accelerator assembly 16, and before the leading end of the string reaches main drive assembly 18, all of the velocity of the string of weiners has been imparted by accelerator assembly 16. However, when casing string 12 is then pulled by the rollers of main drive assembly 18, the casing string is caused to be pulled at a faster linear speed than the surface speed of the rollers of accelerator assembly 16. What then happens is that casing string 12, being continuous in length back to and beyond the rollers of accelerator 16, is pulled past accelerator rollers 44 and 54, thereby imparting a faster rotational speed to those rollers. The result is that accelerator rollers 44 and 54 are made freewheeling relative to drive sprockets 50 and 60 because cam shafts 48 and 58 see relative motion in the opposite direction to the drive direction that is imparted by their respective drive sprockets 50 and 60. In other words, taking for example cam clutch 48, even though one part of the cam clutch is being driven in drive direction 64 by the action of drive sprocket 50, the other portion of cam clutch 48 is connected to the faster turning drive shaft 46, and cam clutch 48 appears to see a rotation of shaft 52 in an opposite direction. Accelerator 44 at this time is therefore freewheeling, the effective driving relationship of shaft 52 not imparting driving energy to drive shaft 46 unless the rotational speed of shaft 52 equals or exceeds the rotational speed of drive shaft 46.

The result of the combination described above for the rollers that comprise main drive assembly 18 and accelerator 16 is to provide a means for automatically bringing the casing string 12 up to an initial velocity that enables the string to reach main drive assembly 18 without operator assistance, the string 12 being enabled to pass through a relatively long distance without additional impartation of driving energy before reaching main drive assembly 18. Once main drive assembly 18 has received the string, the drive rollers of accelerator 16 become freewheeling relative to the string. In operation, it has been found that roller speed ratios such that the surface speed of the rollers of accelerator 16 is one half of the surface speed of the rollers of main drive assembly 18 provides a very efficient operation for decasing machine 10, while at the same time causing minimal damage to weiners 14 passing therethrough. That is, a surface speed ratio of one to two respectively of the accelerator rollers and the main drive assembly rollers has been determined to be a favorable speed relationship between the accelerator and main drive assembly rollers.

As was discussed briefly above for the properties of Visqueen casing material, it has been learned that a proper temperature conditioning of casing string 12 facilitates the removal of casing from weiners 14. The preconditioner 20 is in effect a hotbox wherein casing string 12 passing therethrough is subjected to a steam bath. For purposes of this disclosure, the steam lines have not been shown in the figures. It is sufficient to note that live steam is directed onto the casing string as it passes through a wire mesh tube 120 that is disposed in supporting fashion in preconditioner 20. The preconditioner 20 is comprised of a volume chamber 122 that is generally sealed except for the amount of space required for the entry and passing therethrough of the casing string 12. Normally, it is contemplated that an external source of steam will be provided to decasing apparatus 10, but it is of course within known art to equip the machine with steam producing equipment or the like. While steam has been suggested, general success has been achieved by the use of infrared lamps and other heat sources. It has generally been determined advisable to arrange the steam chamber in a jacket and sleeve arrangement so that the live steam is contained within an inner chamber that is insulated from the outside surfaces of preconditioner 20, thereby preventing operator exposure to hot surfaces. An additional step towards providing operator safety and comfort is the addition of air jets at the entryway and exit of preconditioner 20 such that the live steam contained therein is prevented from exiting the preconditioner. That is, a ring of air jets placed at the entryway and the exit of preconditioner 20 and arranged to create a relatively high pressure area thereat will generally prevent the escapement of steam vapors, thereby preventing the operator from being exposed to the steam.

Casing string 12 moves directly from preconditioner 20 to main drive assembly 18. It is desirable to leave a small space between main drive assembly 18 and preconditioner 20 to facilitate ease of repair or removal of these assemblies, although this is not necessary to the invention disclosed herein. While details of such are not shown in the figures, the casing string 12 travels along smooth surfaces throughout its travel in decasing machine 10. In open spaces between components, casing support means is provided such as the spanner cover 124 shown in FIG. 1 that spans the gap between support blocks 72 and 74 of main drive assembly 18. This spanner cover is a "C" shaped member that is securely attached by snaps or the like so as to be quickly removable and replaceable.

Casing string 12 is traveling in longitudinal direction 130 as it enters main drive assembly 18, as depicted in FIG. 5, and the first set of drive rollers 80 and the second set of drive rollers 90 grip weiners 14 and pull them along at a very high rate of speed. The spacing of third rollers 86 and 96 in a direction 130 away from the other rollers in the first and second sets of drive rollers 80, 90 has been predetermined so as to permit a slitting operation therebetween, as can be seen by the interdisposition of slitter assembly 22 as depicted in FIG. 1.

Figure 6A:
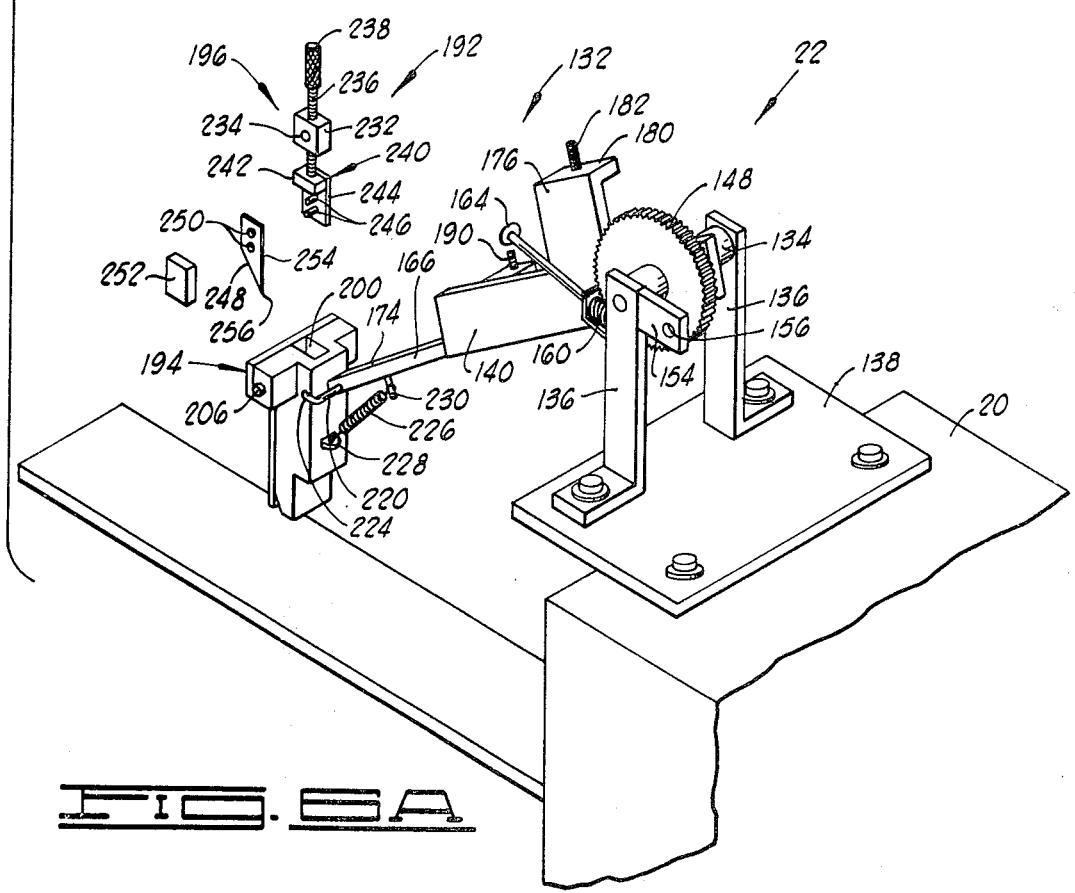

Referring to FIG. 6A, the slitter assembly as shown and generally designated by the numeral 22, comprises an adjustable support assembly 132 having a drum 134 rotatingly journaled between a pair of upright support members 136 that are bolted to a plate 138. The plate 138 is in turn bolted to the top of preconditioner 20 in close spatial proximity to main drive assembly 18. The dimensions of the components of adjustable support assembly 132 are predetermined so as to position a cutter blade, to be described below, in cutting relationship with the casing string 12 disposed between the third rollers 86, 96 and the remaining rollers of the first and second sets of drive rollers 80, 90 of main drive assembly 18. A side view of adjustable support assembly 132 showing the left-hand side 140 is shown in FIG. 6B, and the right-hand side 142 of adjustable support assembly 132 is shown in FIG. 6C.

Adjustable support assembly 132 is comprised of a frame member 144 having a first end 146 pivotally mounted on drum 134. Fixedly mounted to drum 134 is a fine-tooth gear 148 having a reference aperture 150 located therein. Protruding from each end of drum 134 is an arbor portion 152 bearingly mounted in an appropriately sized aperture in the upper end of each of the support members 136. If desired, appropriate bearing means may be provided to minimize component wear. Projecting from one of the support members 136, as shown in FIG. 6A, is a spring tab 154 that has a protruding member 156 matingly receivable in reference aperture 150 in gear 148. The tab 154 is biased so as to press protruding member 156 against gear 148, while being springingly relieved therefrom by the application of finger pressure for permitting the free rotation of drum 134 relative to the upright support members 136. The purpose of the spring tab and reference aperture arrangement is to provide a quick and easy means for rotating the adjustable support assembly 132 upwardly for maintenance purposes, while affording a rapid means of returning to a predetermined setting thereof.

As was stated above, gear 148 is fixedly attached to drum 134, while frame 144 is pivotally attached to this drum. The relative position of frame 144 to gear 148 is established by a worm gear member 158 that is journaled in a box support 160 attached to side 140 of frame 144. Worm gear 158 is in gearing engagement with gear 148 and has an adjusting handle 162 with a knurled knob end 164. Worm gear 158 is established relative to gear 148 such that the turning of knob 164 rotates frame 144 relative to gear 148. This permits the adjustment of the position of frame 144 relative to drum 134, as the position of gear 148 (and thus drum 134) is fixed via tab 156 and aperture 150.

Turning now to FIG. 6C, shown therein is a pivot bar 166 pivotally mounted by a pin and aperture means 168 onto end 170 of frame 144. Pivot bar 166 has a spring retained end 172 and a block holding end 174. Frame 144 has a projecting L-shaped finger 176 with an overlapping lip end 178. A threaded aperture is disposed in lip end 178, and a threaded adjust bolt 182 is matingly retained in this threaded aperture. A spring 184 is connected by one of its ends to the bolt 182 and has its other end connected to an apertured ear 186 projecting from end 172 of pivot bar 166. Also mounted on frame 144 is a stop block 188 disposed between pivot 168 and end 172 of pivot bar 166. A threaded aperture is disposed in stop block 188 and a mating bolt 190 is threadingly engaged therein for purposes of service as an adjustable stop member for pivot bar 166.

Returning to FIG. 6A, shown therein is a blade assembly 192 comprising a head block 194 and a blade holder 196. To facilitate understanding, blade holder 196 is shown withdrawn from head block 194 and its removable parts shown in exploded view fashion. Shown in FIG. 6D is head block 194 with its side plate 198 removed therefrom. Head block 194 is a generally T-shaped member having a hollow core 200. Head block 194 has a transversely projecting portion 202 at the upper end 204. Portion 202 has a bore 206 that extends normal to bore 200 for the purpose of receiving a spring loaded detent button provided to releasably engage a dimple recess blade holder 196, this dimple to be described below. Although not shown in detail, the spring loaded detent button that is mounted in the bore 206 is conventional in design, providing a spring loaded button member protruding into bore 200 and which is depressable so as to be flush with the walls of bore 200 by the application of a force exerted against the button when blade holder 196 is withdrawn from bore 200. Head block 194 is constructed to be symmetrical for purposes of weight balance, and to this end a projecting portion 208 is provided opposite to portion 202. If desired, a spring loaded detent button assembly can be provided in the portion 208 in like manner as provided in bore 206 of portion 202. Bore 200 extends downward from the top surface 210 of head block 194 such that there is a passageway therethrough to the lower edge 212. Side plate 198, a T-shaped member to match the profile of head block 194 is provided to enclose bore 200. Preferably, protruding tabs 214 are provided which are snappingly receivable in apertures 216 in side plate 198. This permits ready access to bore 200 to facilitate cleaning of head block 194.

Head block 194 is attachable to end 174 of pivot bar 166 by means of a spring arbor clip 220 that is received in an aperture 222 in end 174 of pivot bar 166, spring clip 220 having ends 224 that are pivotally received in apertures appropriately disposed in each side of head block 194. That is, the arbor ends 224 of arbor clip 220 are flexibly separable so as to facilitate the quick attachment or demounting of head block 194 from pivot bar 166. One end of a spring 226 is hookingly attached to a protruding tab 230 extending from pivot bar 166 near end 174, and the other end of the spring 226 is attached to an apertured ear 228 projecting from head block 194.

The shape of head block 194, while not limiting in the present invention, is a T-shaped profile as shown in the accompanying figures, providing a lightweight head block that minimizes inertia as weiners 14 strike the cutting blade, a feature which will become clear with the further description that follows. The tendency for the slitter assembly to be bumped so as to jump above the weiners is thus eliminated.

Continuing with FIG. 6A, shown therein is blade assembly 192 comprising a blade holder 196 having a block 232 slidably receivable in bore 200 of head block 194. Block 232 has a dimple recess 234 that matingly receives the spring-loaded detent button disposed in bore 206 to project into bore 200 of head block 194. Although not shown, it may be desirable to provide guide grooves leading into dimple 234 to aid in the compression of the spring-loaded detent button engageable thereby. A threaded aperture is placed through block 232 and a threaded bolt 236 is threadingly engaged therein, bolt 236 having a knob head 238 at one end, and attached to a ferrous back member 240 at the other end thereof. The ferrous back member 240 has a block 242 pivotally attached to bolt 236 and an extending ferrous plate 244 connected thereto. Projecting from ferrous plate 244 is a pair of tip members 246. A cutter blade 248 is provided that has a pair of apertures 250 aligned to mate with the tips 246, blade 248 capable of being snapped onto the ferrous back member 240 and retained loosely thereon by tip members 246. A magnetized ferrous block 252 is magnetically retainable on ferrous back member 240 such that blade 248 is disposed between block 252 and ferrous plate 244. The dimensions of all of the described components of ferrous back member 240, including block 252, are predetermined so as to be slidingly receivable in bore 200. Blade 248 has a cutting edge 254 and a leading point 256.

When assembled in head block 194, blade assembly 192 is positioned in bore 200 and adjusted via knob head 238 to position blade 248 advantageously projecting from the lower edge 212 of the head block. Head assembly 192 is designed to facilitate quick removal from head block 194, thereby providing easy access to blade 248 for blade changes as required. Furthermore, the seating mechanism of the spring-loaded detent button in bore 206 and the provision of dimple 234 in block 232 gives quick set up capability to blade assembly 192. That is, once a proper blade adjustment has been effectuated, this same blade setting is retained following a blade change.

The operation of slitter assembly 22 will be described by referring to an alternate and simplified slitter assembly 22' shown in FIG. 7. Although the physical embodiments shown in FIG. 7 varies from the construction of slitter assembly 22 discussed above and shown in FIGS. 6A through 6D, slitter assembly 22' embodies all of the functional features of slitter assembly 22, and permits discussion of the slitter assembly in a more demonstrative form. For this reason, the functional parts of slitter assembly 22' have been given like numbers to the corresponding functional part of slitter assembly 22, and primes have been added to such numbers in FIG. 7 so as to aid comprehension.

Slitter assembly 22' comprises a pivoting bar 166' pivotable about pivot 168' and biased by a spring 184'. A blade assembly 192' is connected to end 174' of bar 166', and a block 260 pivotally supports a slitter head member 194' via pivot pin 220'. An upswing stop 262 and a downswing stop 264 are established as integral parts of block 260 and serve to define the range of pivotation permitted slitter head member 194' about pivot 220'. A spring 226' is attached to slitter head member 194' and to a connector member 230' extending from block 260.

Basically, it is apparent that bar 166' is biased in a direction 266, and that slitter head member 194' is biased in a direction 268. A blade 248', having a leading edge 254' and a leading point 256', is supported by slitter head member 194', the latter member being forced by the action of springs 184' and 226' into a link engage position represented by the solid lines and designated 270. As weiner 14 pushes against leading point 256' of blade 248', casing 12 is punctured, and as weiner 14 advances, a slit 272 is cut along the outline of the casing that surrounds weiner 14. The linear movement of weiner 14 forces slitter head member 194' to rotate opposite to direction 268 until it strikes upswing stop 262. When slitter head member 194' has reached upswing stop 262, it assumes the stop position 274 that is represented in dashed outline form in FIG. 7. When slitter head member 194' reaches its stop position 274, further force bearing against blade 248 will cause pivot bar 166' to rotate in a direction opposite to that of direction 266.

The principle of operation of slitter assembly 22 and slitter assembly 22' are the same, and the operation of slitter assembly 22 is understandable by description of the operation of slitter assembly 22'. The leading edge of weiner 14 in its linear passage beneath slitter assembly 22' first bumps against leading point 256' and leading edge 254' while slitter head member 194' is in the link engage position 270. At this time, weiner 14 is traveling in a direction 130', and continuing movement of the weiner causes it to push against blade 248' whereupon the angle of the blade is changed with the contour of weiner 14, thereby imparting a slit in the rounded end of the weiner casing. Continued travel of weiner 14 against blade 248' forces the pivotation of slitter head member 194' to its stop position 274, and further movement of weiner 14 then presses against the additional spring pressure exerted by spring 184' that biases pivoting bar 166'. As the blade 248' is changed in relationship to weiner 14, the weiner is caused to move along the edge 254' of the blade. This arrangement provides a superior tracking of slitter assembly 22' in that it provides a full slit 272 cut along the complete length of weiner 14, while allowing adjustment of the spring tension to prevent overcutting casing 12 that would result in damaging the meat of the weiner 14. While such overcutting is not objectionable, per se, it does provide an unsightly mark upon weiner 14 and is undesirable from a marketing viewpoint.

With the description hereinabove given for the embodiment of slitter assembly 22' as illustrated semidiagramatically in FIG. 7, the operation of slitter assembly 22 of FIGS. 6A through 6C will be clear. The only additional comment necessary herein will be that the adjustment of spring 184 is made by positioning bolt 182, and adjustment of spring 226 may be made, if desired, by bending tab 230 slightly. Further, it should be noted that end 174, being attached via arbor clamp 220 to head block 194, serves to restrict the range of pivotation about pivot ends 224 of arbor clamp 220. While this is the preferred form, additional stop members may be provided as desired to limit the pivotation of head block 194 relative to pivot bar 166.

Figure 8:
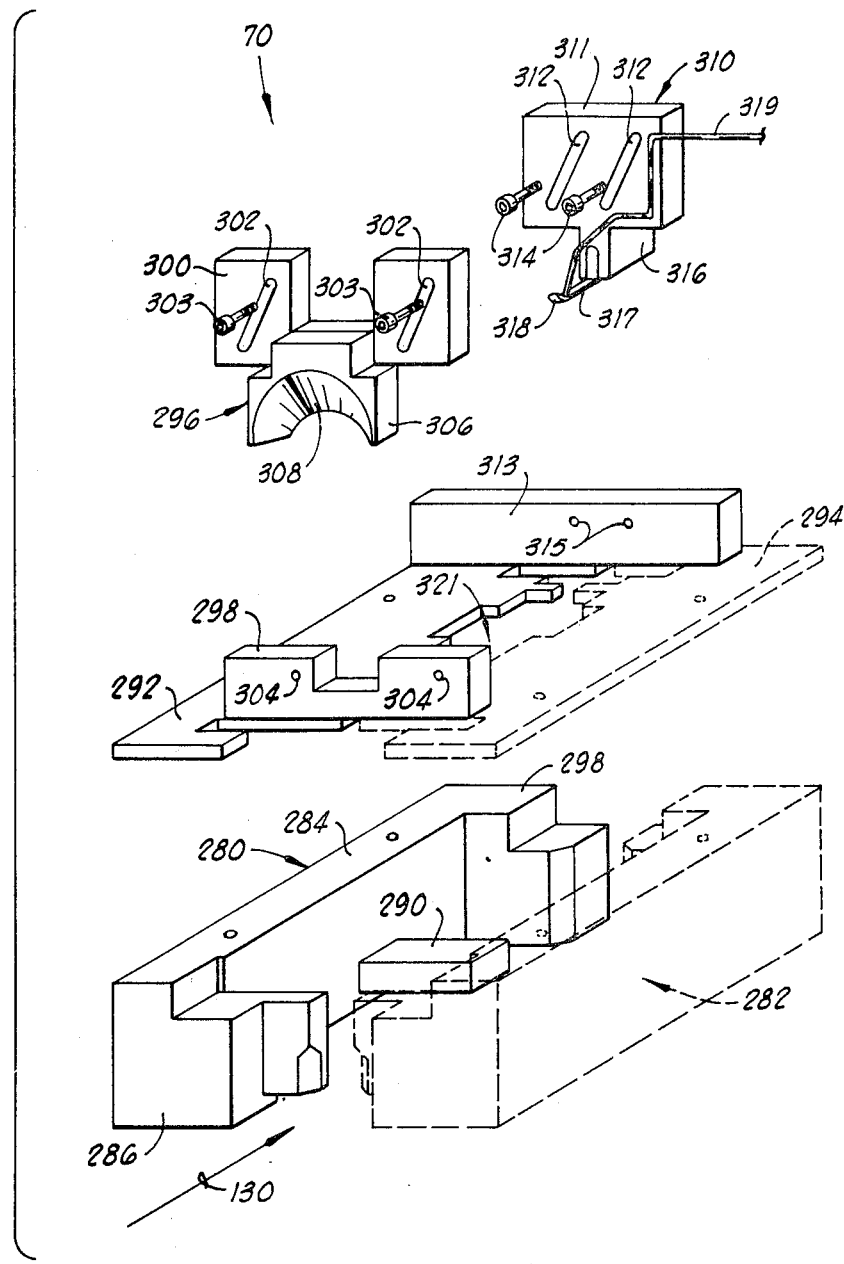
FIG. 8 is an isometric view in exploded detail of the housing assembly disposed about the rollers of the main drive assembly of FIG. 5.

The discussion up to this point has followed casing string 12 as it has passed through accelerator 16, preconditioner 20, and main drive assembly 18. A slit has been cut along the top edge of each of the weiners 14, and the only operation remaining to complete the function of decasing machine 10 is the removal of casing 12 from weiners 14. This function will be performed by a stripper assembly 24 that will be presently discussed. However, prior to discussing stripper assembly 24, the main feed guide assembly 70 will first be described. FIG. 8 shows main feed guide assembly 70 in isometric, semidetailed view, having the components thereof in exploded view. Main feed guide assembly 70 serves as a protective shield about the rollers of main drive assembly 18, and to this end is constructed to generally surround the rollers while permitting passage therethrough of casing string 12 and the positioning of slitter assembly 22.

A first side member 280 and a second side member 282 are secured by conventional bolting means to the drive assembly support blocks 72 and 74 of main drive assembly 18. In order to more fully show the construction of the side members, second side member 282 is shown in dashed line detail in order to fully show side member 280 in FIG. 8. It is recognized that the side members 280 and 282 could assume a large number of shapes and profiles, and it is accordingly unnecessary to detail the construction thereof except in a general way relating to the function of the side members. Side member 280 has a longitudinal member 284 that is disposable along the first set of rollers 80 and a front end 286 and rear end 288 that extend normal to member 284 so as to provide wraparound protection to the first set of drive rollers 80. A finger member 290 extends normal to member 284 and is positioned so as to be disposed as a filler member between the second roller 84 and the third roller 86. The finger 290 merely serves to prevent sideward turning of weiner 14 as it passes between rollers 84 and 86. The structure of side member 282 is generally along the same line of construction as that of side member 280, and serves the purpose of providing like wraparound shield protection to the second set of drive rollers 90 of drive assembly 18.

A cover plate 292 is provided for bolting by conventional means to the top of longitudinal member 284 of first side member 280, and in like manner, a cover plate 294 is securely bolted to the top of side member 282.

An orifice unit 296 is provided for attachment to a block 298 attached to the top of cover plate 292 and which extends over the cover plate 294. The orifice unit 296 has a supporting frame 300 that has a pair of angled slots 302 established therein. As shown in FIG. 8, bolts 303 extend through slots 302 and are threadingly engageable in a pair of spaced apart threaded apertures 304 disposed in block 298. A leading member 306 is supported by the block 300 and extends downward therefrom. Leading member 306 has an arcuate orifice edge 308 that is in the shape of one half of a truncated cone, such that the orifice edge 308 that serves as an impact edge for weiners 14 that are passing through decasing machine 10 in direction 130, the orifice edge directing the leading edge of the weiners downwardly and into the rollers of main drive assembly 18. The purpose of the angled slots 302 is to allow the orifice edge 308 to be centered between the support blocks 72 and 74 as these support blocks are moved toward or away from each other during adjustment thereof, while at the same time causing the orifice edge 308 to be raised or lowered while maintaining its centered position. In this way, as the support blocks 72 and 74 are moved away from each other to accommodate larger sized weiners 14, leading member 306 may be raised by first loosening bolts 303 and sliding block 300 relative to bolts 303 by means of slots 302, thus moving orifice edge 308 upwardly to accommodate the larger weiners, after which bolts 303 are once again tightened.

Disposed at the rear of main feed guide assembly 70, generally adjacent the rear end 288 of side member 280 is a weiner sled guide 310. Weiner sled guide 310 is comprised of a support block 311 having a pair of angled slots 312 therein. Block 311 is adjustably supported on a transversely extending block 313 that is attached to cover plate 292 and which extends transversely thereto in a manner to extend over cover plate 294. Bolts 314 extend through slots 312 and threadingly engage a pair of spaced apart apertures 315 disposed in block 313 such that block 310 is positionable between support blocks 72 and 74 of main drive assembly 18. Slots 312 are angled for the same purpose as slots 302 in block 300 of orifice unit 296, and weiner sled guide 310 is maintainable in a centered position relative to support blocks 72 and 74. A downwardly extending projection at 316 of block 311 has a sled member 317 extending in the manner shown in FIG. 8. Sled member 317 has an upwardly sloping leading edge 318 in the manner of a sled, and an air line 319 leads to an aperture passing through 317 in close proximity to the leading edge 318. Air line 319 is connected to a source of compressed air in conventional manner and projects a jet of air downwardly from the sled 317. Weiner sled guide 310 provides an air jet via the air line 319 at a point in the path of casing string 12 that is just past that point of contact with slitter assembly 22. This arrangement provides a means for opening the slit 274 that has been imparted to the weiner casing by blade 248.

Cover plates 292 and 294, as will be apparent, may assume many configurations to achieve their purpose of supporting the components above described while permitting access to the rollers of main drive assembly 18 of slitter assembly 22 while otherwise guarding the rollers against inadvertent operator exposure thereto. For the purpose of permitting pivot bar 166 to position head block 94 and blade assembly 192 in cutting position between the second drive rollers 84, 94 and the third drive rollers 86, 96, the cover plates 292 and 294 are shaped to provide an entry opening 321 therebetween. Without going into unnecessary detail as to the configurations of cover plates 292 and 294, it is sufficient to state that opening 321 is sized and shaped to allow the entry and free movement of slitter assembly 22 therethrough, while otherwise maximizing the shielding of the rollers of main drive assembly 18 by cover plates 292 and 294. Opening 321 will vary in size as the cover plates 292 and 294 are moved with the adjustment of support blocks 72 and 74, but adequate shielding of the rollers thereunder can be provided for the security of the operator of decasing machine 10.

The discussion herein will now turn to that of the stripper assembly 24, shown in side elevational view in FIG. 1. The components of stripper assembly 24 are shown in the FIGS. 9 through 12. The purpose of stripper assembly 24 is to remove the casing 12 subsequent to the slitting operation that has been effectuated by slitter assembly 22. The function of stripper assembly 24 is to firmly position the weiners 14 passing therethrough, open the slits 272 that have been cut in the casing 12, and grippingly remove the casing without stopping the weiners so that the weiners continue traveling through and out of decasing machine 10.

Supported on frame 11 is a stripper gear assembly 330 that performs the removal of casing 12. Stripper gear assembly 330 is shown in plan view in FIG. 9 and comprises an elongated driven gripping gear 332 rotatable about an axle 334 that is journaled to be generally parallel to the direction of travel of casing string 12 in its travel through decasing machine 10. Driven gripping gear 332 is rotated by the drive axle 334 that has a driver gear 338 on the distal end thereof. The axle 334 is journaled on a frame 340 that is bolted by conventional means to support frame 11. Drive gear 338 is engaged by an output member of an appropriately sized gear box disposed within support frame 11 and which is powered by the variable speed electric motor that has been discussed above.

An arm member 342 is mounted to frame 340 via a shaft pin 344 about which arm member 342 is pivotable. A tunnel groove 346 (shown in dashed outline) is provided in arm member 342 in near proximity to drive axle 344 to provide clearance thereto so as to avoid interference with drive axle 334. At the distal end 348 of arm member 342 there is a biasing means in the form of a spring 350 that is attached thereto and disposed between arm member 342 and a stationary block 352 that is attached to frame 340. The purpose of spring 383 is to resiliently restrain the pivotation of arm member 342 about shaft pin 344. Arm member 342 serves as a spring-loaded pivot arm. An idler gripping gear 354 is bearingly mounted for support by arm member 342 for rotation about an axis generally normal to the axis of rotation of driven gripping gear 332, and the idler gripping gear 354 is mounted for this purpose to one end of shaft 356, the other end of shaft 356 being bearingly mounted in arm member 342.

Driven gripping gear 332 has a first threaded portion 360 having square right-hand threads 362. Driven gripping gear 332 has a second threaded portion 364 having square left-hand threads 366, the second threaded portion 364 comprising the major portion of the length of driven gripping gear 332.

Idler gripping gear 354 has a first threaded portion 368 having square left-hand threads 370 and a second threaded portion 372 having square right-hand threads 374, the second threaded portion 372 comprising a major portion of the length of idler gripping gear 354. FIG. 9A is an isometric, semi-detailed view of idler gripping gear 354 and is provided to more fully illustrate the configuration of the gripping gears.

Driven gripping gear 332 and idler gripping gear 354 are preferably made of a machinable, polymeric material for the purpose of giving a strong, durable and yet somewhat resilient threaded elongated gear. The gripping gears 330 and 332 are placed in side-by-side disposition with right-hand threads 362 of driven gripping gear 332 being reversed pitch to the left-hand threads 370 of idler gripping gear 354, these threads being designed to mesh in the manner of worm gears. In like manner, threads 366 and 374 of gears 332 and 354 respectively are designed to turn in meshing relationship to each other in the manner of worm gears. Driven gripping gear 332 is turned in rotary direction 376, as shown in FIG. 9B by the action of driver gear 338 that is turned by the electric motor and gear box mentioned above. Of course, while a driver gear has been shown, it will be understood that a pulley arrangement could as well be used. The turning of driven gripping gear 332, being threadingly meshed with idler gripping gear 354, drives idler gripping gear 354 in a rotary direction 378 that is opposite in rotary direction to rotary direction 376. Looking at the rotation of gripping gears 332, 354 from the view of FIG. 9, the threads 362 and 370 on the first threaded portions 360 and 368 respectively of gripping gears 332 and 354 will appear to move in an apparent linear direction 380, the linear direction 380 coinciding with the direction of travel 130 of casing string 12 through decasing machine 10. In like manner but in contradirection, threads 366 and 374 on the second threaded portions 364 and 372 of the gripping gears 332 and 354 will appear to move in the apparent linear direction 382, the apparent linear direction 382 being opposite in direction to the apparent linear direction 380.

The purpose of driven gripping gear 332 and idler gripping gear 354 is to grip casing 12 that is blown from weiners 14 by the action of compressed air jets as will be discussed below, and to pull casing 12 downward and through frame 340, appropriate openings being provided to allow the dropping of the removed casing in a receptacle 390 that is provided in support frame 11 for the purpose of catching and accumulating the casings of weiners that have passed through decasing machine 10. The reason that idler gripping gear 354 is held in gearing engagement with driven gripping gear 332 by spring 350 is to permit idler gripping gear 354 to move away from driven gripping gear 332 as removed casing is forced therebetween, and to allow knots in the casing to pass between the gripping gears 332 and 354 without breaking one of these gripping gears or their supporting shafts. The gripping gears 332 and 354 are self-cleaning of any casing that might have a tendency to wrap about the gears as the casing has a tendency to move to the juncture of the first and second threaded portions of each of the gripping gears by the action of the apparent movement in the directions 380 and 382. This cleansing has proven to be a very beneficial feature of the gripping gears 332 and 354. Although it has been found that other cleaning means is generally unnecessary, wiping blade assemblies may be provided to scrape against the outside edges of gripping gears 332 and 354 to prevent wraparound of casing 12 about the gripping gears.

The possibility of casing wrapping around gripping gears 332 and 354 is a possibility, albeit not a too frequent occurrence in decasing machine 10. To prevent jamming of the gripping gears 332 and 354, a microswitch cutoff of the electric motor drive to driver gear 338 is provided in the event that the removed casings load the gripping gears. A finger tab 392 protrudes from pivoting arm member 342, and a microswitch 394 of conventional design is positioned in close proximity to finger tab 392. An overload condition of the gripping gears 332 and 354 will force arm member 342 to pivot about shaft pin 344, forcing finger tab 392 against microswitch 394 to stop the electric motor drive of driver gear 338. It is contemplated that a latching relay be placed in the electric circuitry of the electric motor drive so that an operator, upon cleaning the casing that has caused the overload condition of gripping gears 332 and 354, must reset the latching relay before the operation of the stripper gear assembly 330 can again operate.

Stripped casings, that is, casings that are stripped from the wieners 14 by the action of the gripping gears 330 and 332, fall from the stripping gears and are collected in the receptacle 390 therebelow, as shown in partial cutaway view in FIG. 1. A disposable plastic bag 396 is used to line the walls of receptacle 390, and when the bag is filled to a predetermined level (as indicated by a level indicator, if desired), the bag is removed, sealed and replaced with a similar bag. Although not shown in the figures, it is contemplated that a level control of conventional design be used to indicate a full bag condition by energizing a light or the like.

Figure 10:
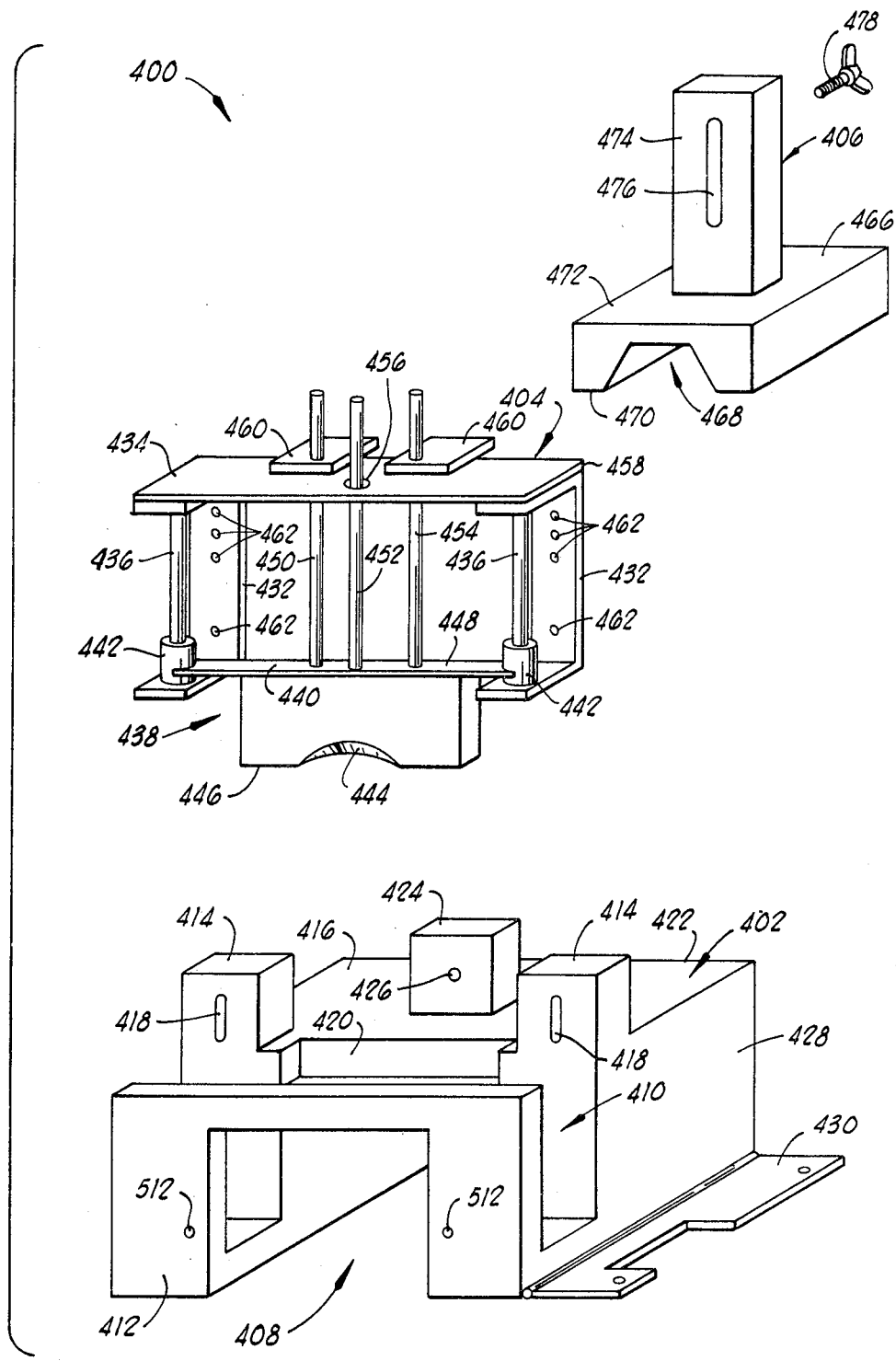
FIG. 10 is an isometric, exploded view of the guide mechanism that is disposed over the stripper gear assembly of FIG. 9.

Located above the stripper assembly 330 is a guide mechanism 400 shown in exploded view fashion in FIG. 10. Guide mechanism 400 is comprised of a housing support 402, an air shoe assembly 404 and an exit guide 406. Housing support 402 serves to cover stripper gear assembly 330 while serving as support for air shoe assembly 404 and exit guide 406. Housing support 402 is generally a cubic structure having a longitudinal bore 408 therethrough and a transverse slot 410 near the front edge 412 thereof. A pair of support blocks 414 extend upward from the top surface 416 and have longitudinal slots 418 therethrough. A relief recess 420 is provided in top surface 416 between support blocks 414. Located near the rear edge 422 is another support block 424 extending upward from top surface 416 and having threaded aperture 426. Located between the edge 422 and the support block 424, there is an aperture that extends from top surface 416 into the longitudinal slot 408 for the purpose of extending exit guide 406 into longitudinal slot 408 in a manner that will be described below. Along the edge 428 of guide mechanism 400 is a hinge 430 that serves to connect guide mechanism 400 to support plate 11c by a conventional bolting means.

Air shoe assembly 404 comprises a pair of "C" shaped members 432 that are held in spaced apart relationship by a top plate 434 that is attached at each of its ends to one of the "C" shaped members. Each of the members 432 has a polished support rod 436 that is connected to and spans the flanged portion of these members. Generally block shaped air shoe 438 has a spanner plate 440 having at each of its ends a bearing member 442 that has an aperture sized to slidingly engage one each of the support rods 436 in a manner that air shoe 438 is movably supported therefrom. Air shoe 438 has an arcuate recess 444 in the lower portion 446, and air passageways connect arcuate recess 444 with the top surface 448 of spanner plate 440. The air tubes 450, 452 and 454 are attached to spanner plate 440 and provide compressed air communication with the air jets located in arcuate recess 444. An aperture 456 is provided in top plate 434 to clearingly pass air tube 452. The other air tubes 450 and 454, are shaped to clear the back edge 458 of top plate 434, each of the air tubes 450 and 454 being provided with stop blocks 460. (Alternatively, the air tubes 450 and 454 may be disposed independently to the air shoe to direct air jets behind the arcuate recess 444.) Each of the "C" shaped members 432 have a series of spaced apart apertures 462 that selectively receive bolts (not shown) for passing therethrough and through slots 418 to position air shoe assembly 404 within transfer slot 410 such that air shoe 438 is disposed in longitudinal slot 408. The stop blocks 460 are disposed in recess 420 when air shoe assembly 404 is attached to housing support 402 and limit the downward travel of air shoe 438, these stop blocks being positionable along their respective air tubes 450 and 454 by means of conventional set screws (not shown).

Exit guide 406 is comprised of a lower block 466 that has a longitudinal slot 468 cut in its lower block 466 that has a longitudinal slot 468 cut in its lower surface 470 in a generally multi-sized configuration, groove 468 designed to provide an exiting passageway for the wieners 14 that have been decased by decasing machine 10. Projecting from the top surface 472 of block 466 is a support member 474 having a longitudinal slot 476 passing therethrough. Exit guide 406 is supported by means of a wing bolt 478 that is placed through slot 476 and threadingly engaged with aperture 426 in support block 424, support member 474 being disposed in the aperture located between rear edge 422 and support block 424 as described above. This arrangement disposes block 466 in longitudinal slot 408 such that groove 468 provides a selectively sized exit passageway for weiners 14 that have been decased by stripper gear assembly 330 and have passed therefrom.

For guiding casing string 12 from main drive assembly 18 into contact with air chute 438 that is disposed in close proximity to the front edge 412 of housing support 402, there is provided a guide mechanism 480, shown in exploded view in FIG. 11. Guide mechanism 480 is comprised of a support block 482 that has a pair of base block members 484, 485, each of which has a transverse slot 486 passing therethrough. A spanner support member 488 is attached to and extends laterally from top surfaces 490 of base block 484, the spanner support member 488 overlapping the other base block 485 to form a slot 492 therebetween. Corner recesses 494 extend downwardly from top surface 490 to provide together with slot 492 a T-shaped slot passing under spanner 488. A finger support member 496 has a block portion 498 that has an L-shaped finger member 500 protruding from the lower edge 502 thereof. A pair of spaced apart angled slots 504 are provided to pass through block portion 498. A pair of threaded apertures 506 are disposed in spanner member 488, the distance between apertures 506 matching the distance between slots 504. Bolts 508 projecting through slots 504 are threadingly engageable with threaded apertures 506 to support finger support member 496 so that finger member 500 is disposed in slot 492 at an adjustable height from the lower surfaces 510 of base blocks 484 and 485. The base blocks 484 and 485 are adjustably connected to the front edge 412 of housing support 402 by passing wing bolts or the like through slots 486 and engaging a pair of threaded apertures 512 in housing support 402. This arrangement provides means to adjust the width of slot 492 via slots 486, and the angularity of slots 504 permit centering of finger member 500 in slot 492 while varying the height thereof.

To this point in the description, the stripper gear assembly 330 and the guide mechanism 400 components of stripper assembly 24 have been described. The final component of stripper assembly 24 to be described is the stripper head cover assembly 520 shown in exploded view fashion in FIG. 12. Stripper head cover assembly 520 is comprised of a base plate 522 that has a longitudinal slot 524 through the top surface 526 thereof. A transverse groove 528 in top surface 526 extends from side 530 to side 532. A tab 534 extends from side 530 and has a top surface 536 that is flush with the recessed surface 538 of transverse slot 528. In like manner, another tab 540 extends from side 532 and has a top surface 542 that is flush with recess surface 538 of transverse slot 528. The length of each of the tabs 534 and 540 is approximately equal to the width of transverse slot 528.

Base plate 522 is comprised of a flat plate 544 having sides 530, 532 and ends 531, 533 that form edges normal to flat plate 526. The longitudinal slot 524 extends through top surface 544 and is cut into the surfaces of edges 531 and 533 in a manner as shown to form a cradle for a weiner support plate 546 that comprises a flat plate 548 that has flanges 550 at the ends thereof, the support plate 546 being shaped to fittingly fill longitudinal slot 524 such that flanges 550 overlap ends 531, 533 of base plate 522. Threaded apertures 552 are disposed to receive appropriately sized bolts (not shown) to hold weiner support plate 546 in place when positioned in longitudinal slot 524. Base plate 522 is positioned on the stripper gear assembly 330 and is hinged along the back end for quick access to the stripper gear assembly 330 (this hinged connection is conventional and is therefore not shown). A rectangular shaped casing disposal passageway 554 is located in flat plate 548 in a position directly over the gripping gears 332 and 354 of stripper gear assembly 330. A channel 556 is formed in the top surface 558 of flat plate 548, this guide channel extending from flange 550 at the forward edge 560 of weiner support plate 546 to edge 562 of casing disposal passageway 554, and extension lip 564 protruding from edge 562 a predetermined distance into passageway 554. Channel 556 serves to guide casing string 12 so as to be centered between the axle shafts 334 and 356 of gripping gears 332 and 354 in a manner that the casing string 12 is presented to the gripping gears just above their line of meshing. The under surface of channel 553 is approximately "V" shaped with arcuate sides so as to be disposed very close to the external surfaces of the threads 362 and 370 in order to position the weiners 14 as close to the gripping gears 332, 354 during passage thereover so that the casing 12 can be easily forced into the gripping gears 332, 354 by the operation of the air jets in the air shoe 438. Although the under side of channel 556 is not shown in FIG. 12, its shape will be understood by the following description of the length determining guide 66.

Length determining guide 566 is a member designed to vary the length of the portion of casing disposal passageway 554 that is exposed to gripping gears 332 and 354. Length determining guide 566 comprises a flat plate 568 having a width approximately equal to flat plate 548 and having a pair of extensive members 570 and 572 on either side thereof, the members 570 and 572 having downward extending flanges 574 and 576 disposed respectively at the distal ends thereof. The lengths of members 570 and 572 are determined to position flanges 574 and 576 in spaced apart relationship such that the inner surfaces 578 and 580 respectively of flanges 574 and 576 are established in near proximity to the outer surfaces of tabs 534 and 540 when length determining guide 566 is mounted onto base plate 522, whereupon members 570 and 572 are disposed in transverse slot 528. Finger adjust bolts 582 are disposed in appropriately threaded apertures located through flanges 574 and 576, these bolts serving as pressure attaching means adjustable against tabs 534 and 540 to secure length determining guide 566 onto base plate 522. The leading edge 584 of plate 568 is tapered as shown in FIG. 12, and a protruding lip guide 586 is attached to and extends from leading edge 584. Lip guide 586 has a top surface 588 that gradually slopes upwardly from a leading tip 590 protrusive from plate 568 so as to be disposed in close proximity to the meshing line of gripping gears 332 and 354. The under side of lip guide 586 is generally "V" shaped with arcuate surfaces that are disposed in near proximity to and along the same curvature as that of the external surfaces of gripping gears 332 and 354 in a manner that serves to scoop up the weiners 14 after the casing 12 has been pulled off so that the weiners will not be damaged by contact with the gripping gears 332 and 354.

A first side guide assembly 594 and a second side guide assembly 596 are provided for determining the width of the portion of casing disposal passageway 554 that is exposed to gripping gears 332 and 354. First side guide assembly 594 has a longitudinal member 598 having a slot 600 in the under side thereof extending from inner surface 602 for a predetermined distance thereunder and which has a connecting slot 604 connecting slot 600 with outer edge 606. A pair of locating holes 608 and 610 are located through longitudinal member 598 and are established in predetermined positions to align with and receive respectively the dowel pins 612 and 614 that extend from top surface 526 of base plate 522. Wing bolts 616 extend through and are retained in appropriately sized apertures along outer edge 606 of longitudinal member 598 and are threadingly engageable with threaded apertures 618 that are disposed in base plate 522 in close proximity to side 530.

The longitudinal member 598 has a tab 620 extending from outer edge 606, the tab 620 having a thickness approximately equal to the portion 622 of longitudinal member 598 that forms the upper surface of slot 600. Adjustably disposable in slot 600 is a side determining guide 624 having a guide member 626 that is a planar member receivable in slot 600 and having a guide edge 628 and rounded corners 630. The side determining guide 624 has a connector arm 632 extending normal from the edge 634, the edge 634 being the edge of the guide member 626 that is opposite to the guide edge 628. The connecting arm 632 is slidably receivable in connecting slot 604 in the under side of longitudinal member 598. Attached to the distal end of connector arm 632 is a yoke 636 which is generally a hollow block having an inner bore 638 positioned to clearingly receive tab 620 therethrough such that the upper portion 640 of yoke 636 is disposed in adjacent relationship to the top surface 642 of tab 620. A threaded aperture passes through portion 640 of yoke 636 and a wing bolt 644 is threadingly engaged therewith and serves the purpose of providing means to secure the side determining guide 624 in the slots 600 and 604.

The second side guide assembly 596 is constructed similarly to, but in mirror image to the first side guide assembly 594. A second side determining guide 624 is provided and disposable in like manner in slots in the under side of longitudinal member 598' of second side guide assembly 596. The structure of second guide assembly 596 will be clear from the description given for first side guide assembly 594, and therefore further description is not herein provided for second side guide assembly 596. However, the component parts of second side guide assembly 596 have been numbered with primed numerals corresponding to like component parts of first side guide assembly 594, as have the dowel pins and threaded apertures of base plate 522 that relate to second side guide assembly 596.

The assembly of stripper head cover assembly 520 is accomplished by placing weiner support plate 546 in longitudinal slot 526 and securing therein by adjusting bolts 552 at both ends thereof. Length determining guide 566 is mounted onto base plate 522 such that flanges 574 and 576 are located adjacent tabs 534 and 540, length determining guide 566 being positioned so that lip guide 586 is positioned relative to lip 564 such that the distance therebetween is less than the length of the individual weiners 14 passing through decasing machine 10. Once length determining guide 566 is so placed, wing bolts 584 are finger tightened to secure it in place. Next, the side guide assemblies 594 and 596 are positioned on base plate 522 as determined by the dowel pins at 612, 614, 612' and 614'. The guide members 626 are positioned to extend from slots 600 and 600' such that they are spaced apart a distance slightly greater than the diameter of the weiners 14, and wing bolts 644 are finger tightened to secure the guide members. The thickness of guide members 626 is established to be slightly less than the depth of the slots 600, 604, 600' and 604' so that these guide members are slidably adjustable toward and away from each other when wing bolts 616 and 616' are tightened to rigidly secure the side guide assemblies 594 and 596 to base plate 522. The arrangement that has been described for the stripper head cover assembly 520 permits the adjustment of the amount of casing disposal passageway 554 that is exposed to gripping gears 332 and 354 for the purpose of permitting the casing 12 to be pulled therethrough while adjustment is possible for various sizes of weiners 14.

OPERATION OF THE PREFERRED EMBODIMENT

Decasing machine 10 is designed to facilitate the removal of casings from strings of food links or weiners as they come from a cooking process. When the weiners 14 come from the cooker, they are contained in strings of casings 12, and these casings must be removed from the weiners so that the individual weiners can be packaged. Decasing machine 10 is designed to accomplish this purpose in a fast, efficient manner with a minimum of product damage. The driving action of accelerator 16 and the positive pull of main feed assembly 18, and the positive stripping action of stripping assembly 24 provide an excellant apparatus for peeling weiners at very high production rates while causing practically no product damage or waste.

As indicated in FIGS. 1 through 3B, weiners 14 enter the tunnel provided in housing 26, and beyond feed the leading edge of casing string 12 into accelerator 16, the machine operator has no other functions to perform during continuous operation of the machine, with the exception of changing bags 422 once they are filled with discarded casings.

Accelerator 16, as described fully above, is comprised of two side-by-side accelerator rollers, and it has been determined that very good results are achieved when the surface speed of the rollers 44 and 54 operate at one-half that of the surface speed of the drive rollers of the main drive assembly 18. This is a recommended speed ratio, and its inclusion in the disclosure herein is not intended as a limitation upon the present invention, as the ratio of surface speeds of the accelerator to the main drive assembly may vary with application.

Cam clutches 48 and 58 allow accelerator rollers 44 and 54 to be driven such that they impart forward motion in direction 130 to casing string 12 enabling the casing string to reach main driving assembly 18, where casing string 12 is picked up and brought up to a full feed speed. When casing string 12 is gripped by the rollers of main drive assembly 18, accelerator rollers 44 and 54 of accelerator 16 are also brought up to a rotation speed greater than the speed at which these rollers are being driven by drive sprockets 50 and 60; at this time, cam clutches 48 and 58 allow the sprockets to free wheel without the exertion of driving force to the accelerator rollers, and casing string 12 is pulled between the accelerator rollers without incurring damage to weiners 14. When the end of casing string 12 has passed through the accelerator 16, the speed of rotation of the accelerator rollers 44 and 54 diminish so as to again come to the driven speed of drive sprockets 50 and 60 respectively, and accelerator 16 is again ready to receive a new string of weiners. The accelerator 16 minimizes product damage, particularly at high machine speeds, since the weiners are brought up to full speed in two stages, viz., one-half of the casing strings' final acceleration being imparted by accelerator 16 and one-half of the casing strings' final acceleration being imparted by main drive assembly 18. Thus, the initial shock and side pull which would be exerted by taking the casing string to full acceleration in one stage is avoided.

The accelerator 16 also increases the potential production rates of decasing machine 10, since the machine operator who feeds the casing strings to the machine does not have to spend time feeding the string through the preconditioner 20 to enable the string 12 to reach all the way to the main drive assembly 18 by the manipulation of manual effort. The operator need only feed the first of the string into accelerator 16, and he is then freed to reach for the next string which is to be fed to decasing machine 10. Usually by the time that he is ready to feed the next casing string to the machine, decasing machine 10 is ready to receive it.

In addition to the above features of dual stage acceleration imparted by decasing machine 10, the physical safety of the operator is a maximum consideration of the present invention since the operator is not required to place his hands close to the opening of preconditioner 20 where he would be exposed to possible heat and steam burns. Accelerator 16 is disposed between the operator's hands and the entry to preconditioner 20; therefore, the danger of burns is practically eliminated. The operative parts of accelerator 16 are covered by housing 26 which permits entry of the weiner string, but does not permit the operator's hands to be drawn into the rollers.

Further, accelerator rollers 44, 54 are adjustable relative to each other by the mechanism disclosed above such that the distance between the rollers can be varied to provide the proper amount of gripping action on weiners 14, regardless of their diameter, by the simple adjustment of the side mounted, spacing adjustment knob 40. This allows accelerator 16 to be adjusted to minimize product damage, while at the same time permitting rapid adjustment to accomodate different sizes of weiners.

The purpose of preconditioner 20 is to condition the casing around the weiners and to loosen the casing such that it can be separated from the weiners without damage to the weiner skin, the weiner skin referring to the natural skin formed by the cooking process as the weiners solidify during the cooking process. In decasing machine 10, preconditioning is accomplished by passing the weiner string 12 through the mesh tube 120 that is contained within the jacket or volume chamber 122. Steam is fed to preconditioner 20 so as to fill the preconditioner with steam to surround the casing string 12 during passage through the mesh tube 120. As discussed above, an air curtain is effectively provided by the provision of air jets located peripherally about each of the openings to preconditioner 20 such that steam contained in preconditioner is prevented from escaping through the entry ports thereto.

The main drive assembly 18 provides the main pulling action on casing string 12 so that the string passes through the decasing machine 10 at a determined rate. The main drive assembly 18 brings the weiner string 12 up to full machine speed after it has passed through the accelerator 16, the accelerator 16 having imparted approximately one half of the string's linear speed through the machine 10.

The structure of the adjustable side-by-side rollers of main drive assembly 18 have been described in detail above, the placement being such that casing string 12 is gripped between the first and second set of drive rollers 80 and 90, the rollers in each set of drive rollers being spatially positioned so that the force exerted on individual weiners 14 is minimal regardless of weiner size. The spaced apart relationship of drive rollers 80 and 90 permits slitter assembly 22 to springingly position head block 194 between the drive rollers, at which point the most efficient action of the slitting by blade 248 is achieved, since weiners 14 are firmly held and casing 12 about them is taut at this point. The rollers of the first and second set of drive rollers 80 and 90 are established spatially so that the distance between the side-by-side rollers can be adjusted for the most efficient operation for various weiner sizes. This adjustment is accomplished by manipulating the two position adjust wheels 116 that rotate position adjust rods 104 and 106 mounted to frame 11 of decasing machine 10. The rotating of the shafts 104 and 106 effectuates adjustment of the distance between both the front and rear of main drive assembly 18.

The purpose of the slitter assembly 22 is to slit the casing string 12 that surrounds weiners 14 in order to permit later entry of directed compressed air to force the casing 12 away from the weiners 14. Head block 194 of slitter assembly 22 is pivotable at the end of pivot bar 166, and is biased in a direction toward the underpassing weiners 14 by the spring 226 so that the tip 256 of blade 248 first contacts the oncoming weiners, after which the blade 248 is caused to be pushed up and the edge 254 caused to contact the casing in a manner that blade 248 remains in firm contact with the passing weiner. Pivot bar 166 is pivotable about pivot pin 168 and is biased downward toward the oncoming weiners via spring 184 such that pivot bar 166 and head block 194 are able to ride up on the weiners in a manner that compensates for changes in position or configuration of weiners 14 as they pass under blade 248.

The blade assembly 192 is constructed in such a manner that the blade holder 196 is easily removable from head block 190 for placing a new blade and holder therein. The design of blade assembly 192 and head block 194 permits blade holder 196 to be positioned in a determined position by having the spring-loaded detent disposed in bore 206 determine the return stop position. The use of ferrous back member 240 and magnetized block 252 permits quick blade changes, and the pivotable attachment of bolt 236 to ferrous back member 240 permits easy adjustment of the cutting depth of the blade into casing 12 via manual manipulation of adjusting knob 238. This design speeds up production by minimizing lost time in blade changes and adjustments, and it also minimizes product damage due to improper blade depth or to improper load force produced on the weiners by slitter assembly 22.

The purpose of the stripper assembly 24 is to remove the casing 12 from weiners 14, dispose of the casing and as a final result, produce individual weiners that are freed for further processing. The action of stripper assembly 24 is produced by two side-by-side externally threaded gripping gears 332 and 354; the stripper head cover assembly 520 that positions the weiners 14 in close proximity to the gripping gears via an adjustable casing disposal passageway 554 thereover; and an arrangement of compressed air jets and guides provided by an overhead guide mechanism 400 that positions the weiners and directs a stream of compressed air or the like onto the weiners to extend a portion of the casing 12 through the casing disposal passageway 554 so that the casing is brought into contact with the gripping gears 332 and 354, whereupon the gripping gears 332 and 354 pull the casing continuously from the weiners. In addition to the action of the guide mechanism 400, guidance and air pressure is exerted against the weiners by the action of the weiner sled guide 310 located at the exiting end of the housing assembly 70 disposed about drive rollers 80 and 90 of the main drive assembly 18.

As discussed above, when the threads of gripping gears 332 and 354 are meshingly engaged while rotating in opposite directions 376 and 378, a tight grip is provided to pick up and pull casings 12 away from weiners 14, thereafter dropping the casings into the disposal bin or receptacle 390 that is lined with a disposable plastic bag 396. Once casing 12 is first picked up by gripping gears 332 and 354, it is not necessary for the compressed air that is directed onto the weiners 14 to hold the casing against the gripping gears as the rotary speed of the gripping gears are established such that the casing will continue to be pulled away from the ongoing weiners without breaking the casing so long as a continuous string of weiners is passing through decasing machine 10. Also, it is not necessary that the casing around the first weiner of a string of weiners be caught by the gripping gears 332 and 354, since the positive pulling action of the threaded gripping gears will pull back and dispose of any casing that might have initially escaped being forced into the gripping gears, thereby preventing casing override. The arrangement of the threads on the gripping gears also minimizes the possibility of the casing wrapping around the gripping gears, since a smooth surface for the casing to adhere to is not present. Precautionary to incurring machine damage in the event of casing wraparound, the limit switch 394 is provided as was discussed above. Wiper blades projecting against the external edges of gripping gears 332 and 354 have been successfully employed, but have been generally found to be unnecessary in most cases as casing wraparound has not been found to be prevalent in the normal operation of decasing machine 10.

The air shoe 438 presents an array of air jets along arcuate recess 444 that rides on the upper surface of weiners 14 as they pass through stripping assembly 24. Air shoe 438 is slidingly supported for vertical movement via bearings 442 that slidingly engage support rods 436, and while springs or the like may be provided to bias air shoe 438 in a downward direction, it has been determined that the weight of the air shoe, correctly established, provides sufficient biasing force for this purpose. Of course, depending upon a particular product application, a biasing force may be provided to partially overcome the weight of the air shoe or to increase the downward force of the air shoe. The arrangement of air shoe 438 described in detail above provides a member that will ride over various sizes and configurations of weiners and the like. The air stream that is directed through the air shoe 438 by the attachment of compressed air to the air tubes 450, 452 and 454, forces air between the casing 12 and the weiners 14, thereby forcing the casing downward toward gripping gears 332 and 354 through the casing disposal passageway 554 where the casing is gripped by the positive gripping action of the gripping gears and stripped away from the weiners 14. The decased weiners 14 continue through the decasing machine and exit under the exit guide 406 to where conventional material handling equipment is provided to move the weiners 14 to further processing stations. Of course, packaging equipment may be used in conjunction with the decasing machine 10 to package the weiners as they exit the machine.

Air shoe 438 can be adjusted vertically to accomodate small to large size weiners by changing the setting of bolts through apertures 462 and slots 418. The air jet that is provided in the weiner sled guide 310 by means of the air line 319, located at the exiting end of housing assembly 70 and just prior to the entry of the weiners 14 into stripper assembly 24, serves as an auxiliary air nozzle to initially open the slits in the casings before the main air stream of air shoe 438 is reached, thereby providing assistance in the case of hard to peel casings.

EMBODIMENT OF FIGS. 13 THROUGH 16

The slitter assembly 22 described hereinabove provides for very good slitting of the casing 12 in the operation of the machine 10. However, at very high rates of operation of the decasing machine 10, it has been found that the momentum imparted to the head block 194 of the slitter assembly 22 by the weiners 14 is of such magnitude as to negative the effectiveness of the action of the spring 184 that is attached to the end 172 of the pivot bar 166. The weiners 14, traveling at a very high rate of linear speed imparted by the cooperative efforts of the accelerator 16 and the main drive assembly 18, impact the blade 248 in the head block 194 and bounce the pivot bar 166 upwardly away from the weiners 14. At these high rates of speed of the weiners 14, an equilibrium condition is established such that the pivot bar 166 is effectively continually removed upwardly from an engage position, being in a partially pivoted upward position because of the countering forces of the spring 186 and the momentum bounce caused by the impacting weiners 14.

An embodiment of the slitter assembly that overcomes the above described condition is shown in FIGS. 13 through 16, the slitter assembly being designated by the numeral 22'. The slitter assembly 22' is similar to the slitter assembly 22, and where applicable, primed numerals are used to designate the components of the slitter assembly 22' that are similar to the components of the slitter assembly 22 shown in FIGS. 6A through 6D. Thus, an abbreviated description of the slitter assembly 22' is provided in view of the detailed description given hereinabove for the slitter assembly 22.

The slitter assembly 22' comprises an adjustable support assembly 132' that is supported by a pair of upright support members 136' attached by conventional bolting means to a subframework 660 which are conventional upright members extending upwardly from the support surface 11c of the support frame 11. It is preferable to support the slitter assembly 22' directly on the support frame 11 to provide maximum rigidity and stability thereto. The adjustable support assembly 132' has a rotatable drum journaled between the upright support members 136' and pivotal about the arbor ends 152'. Fixedly mounted to the rotatingly journaled drum is a fine-tooth gear 148' and an adjusting knob 164 that rotates a worm gear in meshing engagement with the gear 148' to adjust the meshing engagement with the gear 148' to adjust the position of the pivot bar 166' in the same manner that the like components of the slitter assembly 22 serve to adjust the position of the frame 144. The pivot bar 166' is rotatable upwardly about the arbors 152' by the manipulation of spring tab means (not shown) similar to the spring tab means 154 and protruding member 156 of the slitter assembly 22. In FIG. 14, the raised position of the pivot bar 166' reveals the support yoke 662 having a bifurcated upper end 664 and an attaching member 666 connected to one of the support members 136' in a manner that places the bifurcated end 664 in clearing adjacent relationship to the pivot bar 166'. A lock screw member 668 has a shaft 670 that is threadingly engaged with an appropriately placed aperture disposed in the pivot bar 166' so that the shaft 670 is received in the channel 672 formed by the bifurcated end 664 of the support yoke 662. The purpose of the lock screw 668 is to rigidly secure the pivot bar 166' in the support yoke 662 once final adjustment of the head block 194' is effectuated, as will be discussed below. Once fine adjustment has been accomplished by the turning of knob 164' attached to handle 162' to turn the fine-tooth gear 148', the lock screw 668 is tightened to secure the pivot bar 166' in the position shown generally by FIG. 13.

The pivot bar 166' has a bifurcated block holding end 174', the tines 674 located so as to span the head block 194' and are secured thereto by pivot arbor members 676. That is, the head block 194' is pivotable about the arbor members 676 on the tine members 674 that are connected to end 174' of the pivot bar 166'. A tab 228' extends from the head block 194' and a spring 226' is connected to the tab 228' and to the distal ends 678 of an L-shaped member 680 extensive from the block holding end 174' of the pivot bar 166'. A pair of adjustable stop members 682 and 684 extend through the connecting portion 686 of the L-shaped member 680. The adjusting stop member 682 is a threaded rod that is in threading engagement with an appropriately threaded aperture disposed in the portion 686, and a lock nut 688 is provided to lock the stop member 682 in portion 686 of the L-shaped member 680. The stop member 684 also has a lock nut 688 and is adjustably locked in a threaded aperture disposed to extend through the portion 686 of the L-shaped member 680, in like manner to the stop member 682. The stop members 682 and 684 are spaced to project their respective ends 690 and 692 from the surface 694 of the portions 686 of the L-shaped member 680 in a manner that the head block 194' has abutting contact therewith when pivoted about the arbor 676.

The head block member 194' is similar to the head block 194 of FIG. 6D, the exceptions to this to be detailed below. For consideration here, the surface 696 is shaped to have stopping engagement with end 690 of the stop member 682 at the upper portion 698 of the surface 696. In like manner, the recessed portion 700 of the surface 696 is designed to have stopping engagement with the end 692 of stop member 684. As depicted in FIG. 13, the portion 698 of surface 696 abuts the end 690 of stop member 682 when the head block 194' is caused to rotate in direction 702 which corresponds with the position 274 in FIG. 7 wherein the head block is abuttingly engaged with upper stop 262. In like manner, the portion 700 of surface 696 abuts the end 692 of stop member 684 when the head block 194' of FIG. 13 is caused to rotate in the direction 704 (as pulled by the spring 226'), corresponding to the position 270 of FIG. 7 wherein the head block is shown against the lower stop 264. As is the case for the operation of the slitter assembly of FIG. 7, the slitter assembly 22' of FIG. 13 is caused to rotate in the direction 702 by the operation of the impact of the weiners 14 pushing against the blade 248' while the spring 226' biases the head block 194' to rotate about the arbor members 676 in the direction 704. As is clear from FIG. 13, the stop members 682 and 684 may be threaded in their respective apertures to adjust the distance that the ends 690 and 692 extend from the surface 694 of portion 686 of the L-shaped member 680.

Turning now to a description of the head block 194' and the blade assembly 192', the partial cutaway view of FIG. 15 will facilitate an understanding of these components when considered with the end view of FIG. 16 which shows the side plate 198' removed. The head block 194' is similar to the head block 194 of FIG. 6D with the exception that the bore 200' extending through the head block 194' is bottomed by the portion 706 at the lower end 708 of the head block 194'. Also, the bore 200' is slot-like in that the front 710 of the head block 194' is open so as to have communication with the bore 200'. A strap 712 extends laterally across the bore 200' along the front 710. A side plate 198', similar to the T-shaped side plate 198 of FIG. 6D, is positionable so that its leg portion 714 is positionable along the front 710 in back of the strap 712 to enclose the front portion of bore 200', and the shoulder portion 716 is received in the recesses at the top surfaces 718 of the front 710 of the head block 194'.

Extending the length of the head block 194' is a groove 720 that has communication with the bore 200', the groove 720 serving as a clearance groove for the blade 248' of blade assembly 192'.

The blade assembly 192' is similar in construction to the blade assembly 192 as shown in FIG. 6A and as described hereinabove in detail. Therefore, it will be sufficient to only further state that the blade 248 is constructed to extend from the rear 722 of the head block 194' as shown in FIGS. 13 and 15. It will be noted that a lock nut 724 has been added to the bolt 236' to lock the position of the bolt 236' to its position in block 232'. Also, the block 232' is shown with a dimple 234' on two sides of the block 232'. The head block 194' has protrusions 202' and 208' that are similar to the members 202 and 208 of the head block 194 as shown in FIG. 6D. Detent means 726 of conventional design are disposed in threaded apertures that extend transversely to the head block 194' to engage with the dimples 234' in the block 232'. As was described above for the blade assembly 192, the blade assembly 192' is quickly removable from disposition in the bore 200' in the head block 194', and is quickly returned to its former position by the dimple and detent means 234' and 726. The side plate 198' is removable, and with the removal of the blade assembly 192', the bore 200' is vacated to provide access for thorough cleaning and sanitizing.

The operation of the slitter assembly 22' as shown in FIGS. 13 through 16 is identical with the operation of the slitter assembly shown diagrammatically in FIG. 7 with the exception that there is no secondary movement of the pivot bar 166' in that the pivot bar 166' is held rigidly stationary by the support yoke 662 and the lock screw 668. The operation of the knife blade 248' in the embodiment of FIGS. 13 through 16 is identical with the operation of the blade 248' of FIG. 7 as described for the rotation of the head block of FIG. 7 from the engaged position 270 to the rotated position 274. It has been determined in actual operation that the embodiment of the slitter assembly 22' of FIGS. 13 through 16 provides a means for imparting a slit in the casing 12 about the weiners 14, the slit being imparted at very high rates of speed of the weiners 14 with the result that the weiners 14 are not marked by the slitter blade 248'. That is, the embodiment of the slitter assembly 22' of FIGS. 13 through 16 affords an improved slitter means which offers high speed operation while imparting no product damage. Although the slitter assembly 22' of FIGS. 13 through 16 is especially adapted for high speed operation, the slitter assembly 22' may be used throughout the range of operation of the decasing machine 10.

An implement for use with the slitter assembly 22' of FIGS. 13 through 16 is the link pressure applicator shown in FIG. 17. The link pressure applicator 730 has an elongate member 732 having a bifurcated end 734 and a connector end 736 that has a pad 738 connected thereto and which is attached to a block 740 attached to the orifice unit 296 of the main feed guide assembly 70 as shown in FIG. 8. The link pressure applicator 730 is designed to extend from the back of orifice unit 296 such that the tines 742 and 744 of the bifurcated end 732 are positioned on either side of the lower portion 706 of the head block 194'. The tines 742 and 744 are adjusted with the adjustment of the orifice unit 296 to rest firmly on the weiners 14 moving in the direction 130, the tines 742 and 744 serving to gently but firmly position the weiners under the head block 194'. Although the link pressure applicator 730 is not essential to the present invention, its utilization has been found beneficial to the operation of the decasing machine 10, especially when decasing weiners 14 that are not configured to extend symmetrically along their lengths. It should also be pointed out that the link pressure applicator 730 can be used with the slitter assembly 22 of FIGS. 6A through 6D.

Shown in FIG. 18 is a spanner member 750 used in association with the stripper head cover assembly of FIG. 12. As described hereinabove for the stripper head cover assembly 520, a casing disposal passageway 554 in the weiner support plate 546 is made adjustable by the adjustment laterally of the two side determining guides 624, and by the adjustment of the length determining guide 566. While the stripper head cover assembly 520 is usually quite adequate for most weiner applications, it has been found that certain weiner configurations require that the side determining guides 624 and the length determining guide 566 be so closely spaced from each other that the effective area of the casing disposal passageway 554 is greatly reduced. This is the case when very short weiners are used, or when weiners have an amount of curvature such that the weiners are prone to "dive" into the gripping reach of the driven gripping gear 332 and the idler gripping gear 354.

The spanner member 750 is an elongated member that is shaped to be placed in lateral disposition to the casing disposal passageway 554 in a manner similar to the length determining guide 566. At the end 754 of linear member 752 is a flange 756 and a wing bolt 758 that is threadingly engaged with a threaded aperture 760. In like manner, the end 762 has a flange member 764 and a wing bolt 766 threadingly engaged with a threaded aperture 768. The length of the linear member 752 is predetermined so as to dispose the flange members 756 and 764 in overlapping adjacent relationship respectively to the tab 534 and to the tab 540 so as to support the spanner member 750 in the same manner as the length determining guide 566. The wing bolts 758 and 766 are used to secure the spanner member 750 to the tabs 534 and 540. In approximately the center of the linear member 752 there is formed a generally V-shaped portion 770 having arcuate sides 772 and 774. The under side of the side portions 772 and 774 are shaped in similar manner to that of the lip guide 586 of the length determining guide 566. That is, the under sides of the side portion 772 and 774 are designed to be placed in contiguous relationship to the gripping gears 332 and 354 at the meshing line thereof.

The use of the spanner member 750 is as follows. In the assembly of the stripper head cover assembly 520, the spanner member 750 is mounted on the tabs 534 and 540 at the same time and in the same manner as the length determining guide 566. Following this, the remaining portions of the stripper head cover assembly 520 are assembled as described above. The adjustment of the casing disposal passageway 554 is the same as before described, with the exception that the spanner member 750 is placed approximately half way between the lip 564 of the weiner support plate and the lip guide 586 of the length determining guide 566. The V-shaped portion 770 serves to prevent the food links or weiners 14 from entering the casing disposal passageway 550 prior to the time that the leading edge of the food links or weiners reach the lip guide 586. The use of the spanner member 750 permits the placement of the length determining guide at a greater distance from the lip 564, thereby exposing more of the driven gripping gear 332 and the idler gripping gear 354 to the casing that is blown downwardly by the air shoe assembly 404. The spanner member 750 serves to provide interim support for the weiners traveling over the gripping gears 332 and 354.

Thus, the present invention is well adapted to carry out the objects and attain the ends and advantages mentioned as well as those inherent therein. While presently preferred embodiments of the invention have been described for purposes of this disclosure, it will be recognized that numerous changes may be made which will readily suggest themselves to those skilled in the art which are encompassed within the spirit of the invention discussed and as defined in the appended claims.

What is claimed is:

1. An apparatus for removing the casing from a string of food links, comprising:
a frame;
accelerator means, supported on the frame, for accelerating the string of food links in a gripping mode to increase the linear velocity of the string of food links to a first velocity in a first direction of travel through the apparatus, the accelerator means having a free wheeling mode in which the accelerator means permits free passage of the string of food links when the string of food links is caused to move at a linear velocity greater than the first velocity;
main drive means, supported on the frame, for increasing the velocity of the string food links to a linear velocity greater than the first velocity, the main drive means receiving the string of food links from the accelerator means;
slitter means supported on the frame for imparting a slit in the casing of each of the food links; and
stripper means for removing the casing from the string of food links in a second direction while the food links continue in the first direction of travel.

2. The apparatus of claim 1 wherein the accelerator means comprises:
a first roller assembly including a first roller rotatable in a first angular direction about an axis of rotation;
a second roller assembly including a second roller rotatable in a second angular direction generally opposite to the first angular direction about an axis of rotation;
positioning means adjustably positioning the first and second roller assemblies in spaced apart relationship, the axis of rotation of the first roller being generally parallel to the axis of rotation of the second roller;
first clutch means rotatingly connected to the first roller assembly rotating the first roller;
second clutch means rotatingly connected to the second roller assembly rotating the second roller; and,
means connected to first and second clutch means for rotating the first clutch means in the first angular direction and for rotating the second clutch means in the second angular direction.

3. The apparatus of claim 2 wherein:
the first roller assembly further comprises:
a first roller assembly support block supporting the first roller and having a threaded aperture therethrough, the aperture passing normal to the direction of the axis of rotation of the first roller and threaded in a first threaded direction;
the second roller assembly further comprises:
a second roller assembly support block supporting the second roller and having a threaded aperture therethrough, the aperture passing normal to the direction of the second, and threaded in a second threaded direction opposite to the first threaded direction; and,
the positioning means further comprises a longitudinal bar having first and second threaded portions thereof, the first threaded portion threaded in the first threaded direction and threadingly engaged with the threaded aperture of the first roller assembly support block, and the second threaded portion threaded in the second threaded direction and threadingly engaged with the threaded aperture of the second roller assembly support block.

4. The apparatus of claim 2 wherein:
the first clutch means further comprises
a clutch releasably rotating the first roller when the first roller is rotating at a surface velocity less than a velocity approximately equal to the first velocity of the links, and releasing the first roller when the first roller is rotating at surface velocities exceeding a velocity approximately equal to the first velocity; and,
the second clutch means further comprises
a clutch releasably rotating the second roller when the second roller is rotating at a surface velocity less than a velocity approximately equal to the first velocity of the links, and releasing the second roller when the second roller is rotating at surface velocities exceeding a velocity approximately equal to the first velocity.

5. The apparatus of claim 1 wherein the main drive means comprises:
a first drive assembly support block;
a first set of drive rollers rotatably supported by the first drive assembly support block about axes of rotation, the first set of drive rollers rotatable in a first angular direction;
a second drive assembly support block;
a second set of drive rollers rotatably supported by the second drive assembly support block about axes of rotation, the second set of drive rollers rotatable in a second angular direction generally opposite to the first angular direction;
positioning means adjustably positioning the first and second drive assembly support blocks in spaced apart relationship, the axes of rotation of the first set of drive rollers being generally parallel to the axes of rotation of the second set of drive rollers; and,
means for rotating the first set of drive rollers in the first angular direction and for rotating the second set of drive rollers in the second angular direction.

6. The apparatus of claim 5 wherein:
the first drive assembly support block has a threaded aperture therethrough passing in a direction normal to the first direction;
the second drive assembly support block has a threaded aperture therethrough passing in a direction normal to the first direction; and,
the positioning means is characterized as including a position adjusting rod rotatably supported on the frame and having a first threaded portion threadingly engaged with the aperture of the first drive assembly support block and a second threaded portion threadingly engaged with the aperture of the second drive assembly support block, whereby the rotating of the position adjusting rod establishes the distance between the first drive assembly support block and the second drive assembly support block.

7. The apparatus of claim 1 further comprising:
preconditioner means for conditioning the food links for casing removal.

8. The apparatus of claim 7 wherein the preconditioner means comprises:

a volume chamber supported by the frame;

a mesh tube extending through the volume chamber and surrounded thereby; and heating means for subjecting the casings of the links to heat.

9. In a decasing apparatus for removing the casings from food links wherein the food links are contained in a casing string, the apparatus having a frame, casing slitter means and casing stripper means, the improvement comprising:

accelerator means supported on the frame for imparting a first velocity to the casing string in a gripping mode of the accelerator means, the accelerator means having a free-wheeling mode in which the casing string is permitted to pass freely when the casing string is caused to move therethrough at a velocity greater than the first velocity; and, main drive means supported on the frame for increasing the velocity of the casing string to a velocity greater than the first velocity, the accelerator means being placed thereby into the freewheeling mode.

10. The apparatus of claim 9 wherein the accelerator means comprises:

a first roller assembly including a first roller rotatable in a first angular direction about an axis of rotation;

a second roller assembly including a second roller rotatable in a second angular direction generally opposite to the first angular direction about an axis of rotation;

positioning means adjustably positioning the first and second roller assemblies in spaced apart relationship, the axis of rotation of the first roller being generally parallel to the axis of rotation of the second roller;

first clutch means rotatingly connected to the first roller assembly rotating the first roller;

second clutch means rotatingly connected to the second roller assembly rotating the second roller; and, means connected to first and second clutch means for rotating the first clutch means in the first angular direction and for rotating the second clutch means in the second angular direction.

11. The apparatus of claim 10 wherein:

the first roller assembly further comprises:

a first roller assembly support block supporting the first roller and having a threaded aperture therethrough, the aperture passing normal to the direction of the axis or rotation of the first roller and threaded in a first threaded direction;

the second roller assembly further comprises:

a second roller assembly support block supporting the second roller and having a threaded aperture therethrough, the aperture passing normal to the direction of the second, and threaded in a second threaded direction opposite to the first threaded direction; and, the positioning means further comprises a longitudinal bar having first and second threaded portions thereof, the first threaded portion threaded in the first threaded direction and threadingly engaged with the threaded aperture of the first roller assembly support block, and the second threaded portion threaded in the second threaded direction and threadingly engaged with the threaded aperture of the second roller assembly support block.

12. The apparatus of claim 11 wherein:

the first clutch means further comprises a clutch releasably rotating the first roller when the first roller is rotating at a surface velocity less than a velocity approximately equal to the first velocity of the links, and releasing the first roller when the first roller is rotating at surface velocities exceeding a velocity approximately equal to the first velocity; and, the second clutch means further comprises a clutch releasably rotating the second roller when the second roller is rotating at a surface velocity less than a velocity approximately equal to the first velocity of the links, and releasing the second roller when the second roller is rotating at surface velocities exceeding a velocity approximately equal to the first velocity.

13. The apparatus of claim 9 wherein the main drive means comprises:

a first drive assembly support block;

a first set of drive rollers rotatably supported by the first drive assembly support block about axes of rotation, the first set of drive rollers rotatable in a first angular direction;

a second drive assembly support block;

a second set of drive rollers rotatably supported by the second drive assembly support block about axes of rotation, the second set of drive rollers rotatable in a second angular direction generally opposite to the first angular direction;

positioning means adjustably positioning the first and second drive assembly support blocks in spaced apart relationship, the axes of rotation of the first set of drive rollers being generally parallel to the axes of rotation of the second set of drive rollers; and, means for rotating the first set of drive rollers in the first angular direction and for rotating the second set of drive rollers in the second angular direction.

14. The apparatus of claim 13 wherein:

the first drive assembly support block has a threaded aperture therethrough passing in a direction normal to the first direction;

the second drive assembly support block has a threaded aperture therethrough passing in a direction normal to the first direction; and, the positioning means is characterized as including a position adjusting rod rotatably supported on the frame and having a first threaded portion threadingly engaged with the aperture of the first drive assembly support block and a second threaded portion threadingly engaged with the aperture of the second drive assembly support block, whereby the rotating of the position adjusting rod establishes the distance between the first drive assembly support block and the second drive assembly support block.

* * * * *